(12) United States Patent
Miyoshi et al.

(10) Patent No.: US 12,463,474 B2
(45) Date of Patent: Nov. 4, 2025

(54) STATOR FOR ROTATING ELECTRICAL MACHINE AND METHOD FOR MANUFACTURING STATOR FOR ROTATING ELECTRICAL MACHINE

(71) Applicant: AISIN CORPORATION, Aichi (JP)

(72) Inventors: Yoichi Miyoshi, Kariya (JP); Masahiro Nagaya, Kariya (JP)

(73) Assignee: AISIN CORPORATION, Kariya (JP)

( * ) Notice: Subject to any disclaimer, the term of this patent is extended or adjusted under 35 U.S.C. 154(b) by 141 days.

(21) Appl. No.: 18/280,810

(22) PCT Filed: May 10, 2022

(86) PCT No.: PCT/JP2022/019833
§ 371 (c)(1),
(2) Date: Sep. 7, 2023

(87) PCT Pub. No.: WO2023/276452
PCT Pub. Date: Jan. 5, 2023

(65) Prior Publication Data
US 2024/0297539 A1    Sep. 5, 2024

(30) Foreign Application Priority Data

Jun. 30, 2021   (JP) .................................. 2021-108370

(51) Int. Cl.
*H02K 1/16* (2006.01)
*H02K 3/28* (2006.01)
(Continued)

(52) U.S. Cl.
CPC ............ *H02K 1/165* (2013.01); *H02K 3/28* (2013.01); *H02K 15/026* (2013.01); *H02K 15/085* (2013.01)

(58) Field of Classification Search
CPC ........ H02K 1/165; H02K 3/28; H02K 15/026; H02K 15/085
See application file for complete search history.

(56) References Cited

U.S. PATENT DOCUMENTS

2018/0301950 A1    10/2018   Adachi et al.
2023/0093998 A1    3/2023    Miyoshi et al.

FOREIGN PATENT DOCUMENTS

JP      2018-182963 A      11/2018
JP      2019037046 A   *   3/2019
WO      2021/240989 A1     12/2021

OTHER PUBLICATIONS

JP2019037046A English translation (Year: 2025).*
Jul. 5, 2022 International Search Report issued in International Patent Application No. PCT/JP2022/019833.

* cited by examiner

*Primary Examiner* — Christopher M Koehler
*Assistant Examiner* — Viswanathan Subramanian
(74) *Attorney, Agent, or Firm* — Oliff PLC

(57) ABSTRACT

A stator for a rotating electrical machine includes a stator core and a stator coil of a plurality of phases. The stator coil is formed by winding a plurality of double-wound coils of each phase around the stator core along an entire circumference of the stator core. Each of the plurality of double-wound coils concentrically include a coil portion with a larger circumference length and a coil portion with a shorter circumference length. The double-wound coil of each phase includes a first double-wound coil farthest from a neutral point and a second double-wound coil other than the first double-wound coil. Of the first double-wound coils of first to third phases, only the combination of the first double-wound coils of the first and second phase overlaps in a specific circumferential section corresponding to at least one (Continued)

slot, and the first double-wound coils of different phases are inserted in different slots.

5 Claims, 14 Drawing Sheets

(51) Int. Cl.
*H02K 15/026* (2025.01)
*H02K 15/085* (2006.01)

STATOR FOR ROTATING ELECTRICAL MACHINE AND METHOD FOR MANUFACTURING STATOR FOR ROTATING ELECTRICAL MACHINE

TECHNICAL FIELD

The present disclosure relates to stators for rotating electrical machines and methods for manufacturing a stator for a rotating electrical machine.

BACKGROUND ART

There is known a stator for a rotating electric machine in which a plurality of coil wires of different phases is arranged to overlap each other in the circumferential direction in a part of a plurality of slots.

RELATED ART DOCUMENTS

Patent Documents

Patent Document 1: Japanese Unexamined Patent Application Publication No. 2018-182963 (JP 2018-182963 A)

SUMMARY OF THE DISCLOSURE

Problem to be Solved by the Disclosure

In the related art described above, however, double-wound coil portions and single-wound coil portions are alternately arranged in the circumferential direction for each phase. Therefore, the number of types of coils forming a stator coil increases and the winding method is complicated.

When one type of double-wound coils is used, these problems can be solved. However, depending on the arrangement of the double-wind coils of each phase, the double-wound coils of different phases may be located close to each other at the coil ends or in the slots. When the double-wound coils of different phases are close to each other in the radial direction, it is necessary to take measures for phase-to-phase insulation such as providing interphase insulation paper, which may lead to an increase in cost etc. In particular, the double-wound coils of different phases located farthest from the neutral point have a higher potential difference than the other double-wound coils of different phases. Therefore, when such double-wound coils of different phases are close to each other in the radial direction, the need for phase-to-phase insulation increases.

It is an object of the present disclosure to reduce or eliminate the need for measures for phase-to-phase insulation while using one type of double-wound coils.

Means for Solving the Problem

According to one aspect of the present disclosure, a stator for a rotating electrical machine is provided that includes: a stator core having a plurality of slots; and a stator coil formed by winding a plurality of double-wound coils of each phase, each including two concentric coil portions having a closed coil shape as viewed in a radial direction, around the stator core along an entire circumference of the stator core. Each of the two coil portions in one double-wound coil forms the closed coil shape by: slot insertion portions on both sides in a circumferential direction that are inserted into different slots; and crossovers on both sides in an axial direction that extend in the circumferential direction between end portions on both sides in the axial direction of the slot insertion portions on both sides in the circumferential direction. The plurality of double-wound coils is inserted in each slot in such a manner that the slot insertion portion of one of the double-wound coils is radially adjacent to the slot insertion portion of another one of the double-wound coils. The double-wound coil of each phase includes a first double-wound coil farthest from a neutral point and a second double-wound coil other than the first double-wound coil. Of the first double-wound coil of a first phase, the first double-wound coil of a second phase, and the first double-wound coil of a third phase, only a combination of the first double-wound coil of the first phase and the first double-wound coil of the second phase overlaps in a specific circumferential section corresponding to at least one slot, and the slot insertion portions of the first double-wound coils of different phases are inserted in different slots.

Effects of the Disclosure

According to the present disclosure, it is possible to reduce or eliminate measures for phase-to-phase insulation while using one type of double-wound coils.

MODES FOR CARRYING OUT THE DISCLOSURE

Figure 1:
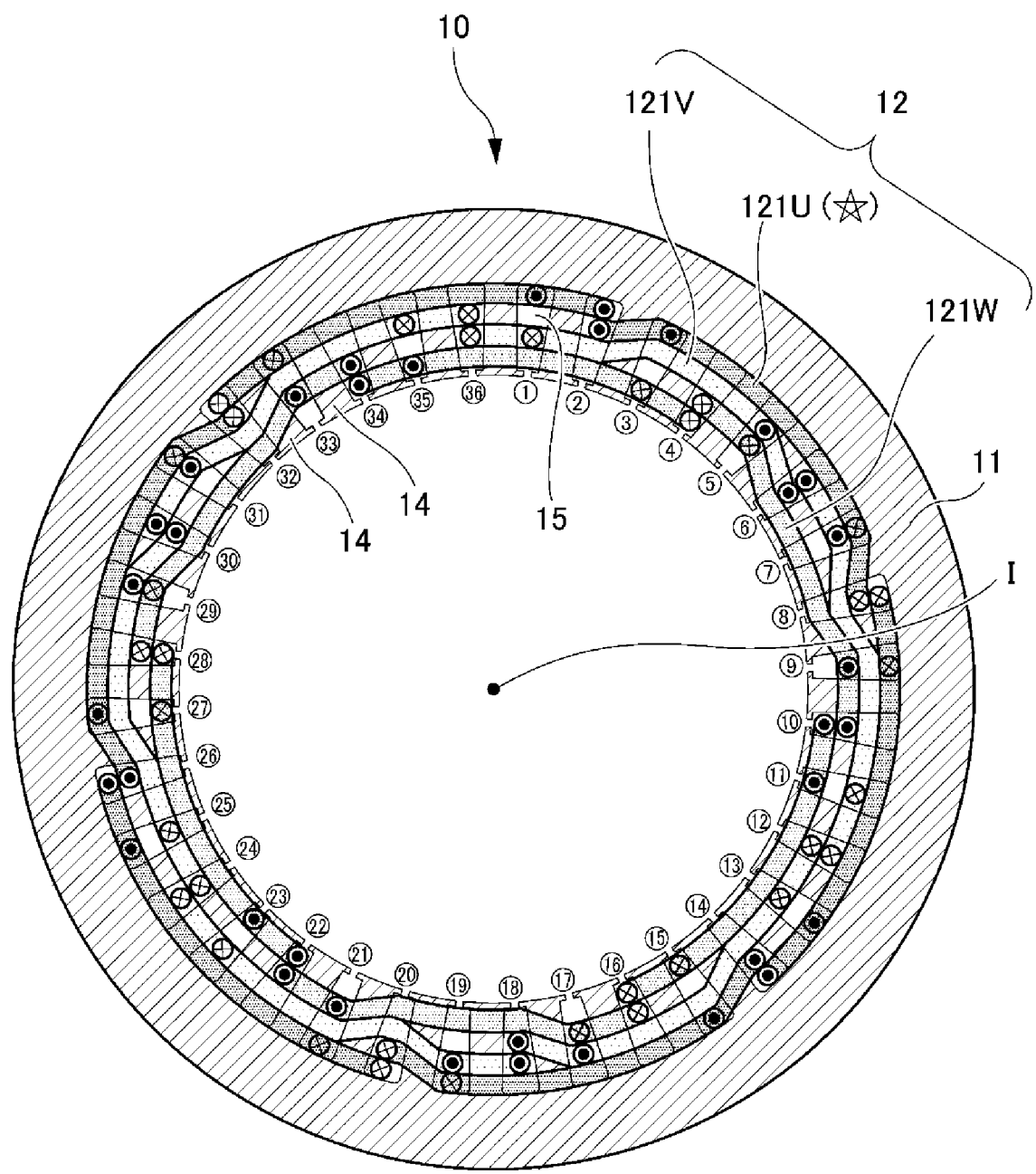
FIG. 1 is a sectional view of a stator for a rotating electrical machine according to a first embodiment.

Embodiments will be described in detail below with reference to the accompanying drawings. The dimensional ratios in the drawings are merely illustrative, and are not limited to these. The shapes etc. in the drawings may be partially exaggerated for convenience of description.

FIG. 1 is a sectional view of a stator 10 for a rotating electrical machine according to an embodiment. In the following description, the axial direction refers to a direction in which a rotation axis (rotation center) I of the rotating electrical machine extends, and the radial direction refers to a radial direction about the rotation axis I. Therefore, the radially outer side and radially outward refer to a side away from the rotation axis I, and the radially inner side and radially inward refers to a side toward the rotation axis I. The circumferential direction corresponds to a rotation direction about the rotation axis I. For simplicity, in FIG. 1 etc., reference signs may be given only to part of a plurality of portions having the same attribute.

FIG. 1 shows a cross section of the stator 10 taken along a section perpendicular to the axial direction. In FIG. 1 (the same applies to FIG. 5 etc. that will be described later), each coil portion inserted in a slot 15 (slot insertion portion) is marked with a symbol "x" in a circle or "small ●" in a circle. The difference between the symbols corresponds to the difference in current flow direction during energization (i.e., direction toward the viewer in the axial direction or direction away from the viewer in the axial direction). In FIG. 1 (the same applies to FIG. 5 etc. that will be described later), a stator coil 12 is schematically shown together with its portions other than the slot insertion portions so that the arrangement in the circumferential direction can be understood.

The rotating electrical machine is of an inner rotor type, and the stator 10 is provided so as to surround the radially outer side of a rotor (not shown). The rotating electrical machine may be, for example, a vehicle drive motor that is used in a hybrid electric vehicle or a battery electric vehicle. However, the rotating electrical machine may be used for any other purpose.

The stator 10 includes a stator core 11 and a stator coil 12.

The stator core 11 is composed of, for example, magnetic steel laminations having an annular shape. Teeth 14 protruding radially inward are formed in a radial pattern in an inner peripheral portion of the stator core 11. The plurality of teeth 14 defines a plurality of slots 15 between the teeth 14 adjacent to each other in the circumferential direction. Although any number of teeth 14 and any number of slots 15 associated therewith may be provided, 36 teeth 14 and 36 slots 15 are provided as an example in the present embodiment. In FIG. 1, the 36 slots 15 are denoted by numerals 1 to 36 in circles. Hereinafter, each of the individual slots 15 is represented by "slot 15-$k$" (k=1 to 36). For example, a slot 15-1 represents a slot 15 shown by the numeral "1" in a circle. In the present embodiment, a three-phase, six-pole, 36-slot rotating electrical machine is used as an example. However, the number of phases, the number of poles, and the number of slots may be changed as appropriate. In the case of three phases, six poles, and 36 slots, six slots correspond to a coil pitch for full-pitch winding. Therefore, five slots or less correspond to a coil pitch for short-pitch winding, and seven slots or more correspond to a coil pitch for long-pitch winding.

The stator coil 12 is wound around the teeth 14 of the stator core 11 (that is, in the slots 15). The stator coil 12 is wound around the stator core 11 by double-layer winding. For example, the stator coil 12 may be electrically connected at a neutral point of star connection in one or more parallel relationships (see FIG. 4).

In the double-layer winding, a change (distribution) in magnetomotive force with a change in angle can be made relatively gentle (because the waveform of the magnetomotive force can be made closer to a sine wave). Therefore, spatial harmonics can be reduced. That is, noise vibration (NV) performance is improved.

In the present embodiment, the stator coil 12 is formed by double-wound coils 121U, 121V, and 121W that are wound concentrically with different circumferential lengths for a U-phase (example of the first phase), a V-phase (example of the third phase), and a W-phase (example of the second phase). The double-wound coil 121U is for the U-phase. In the present embodiment, six double-wound coils 121U are provided. Similarly, the double-wound coil 121V is for the V-phase, and six double-wound coils 121V are provided. The double-wound coil 121W is for the W-phase, and six double-wound coils 121W are provided. Hereinafter, when the phases of the double-wound coils 121U, 121V, and 121W are not distinguished, they are simply referred to as "double-wound coils 121."

Figure 2:
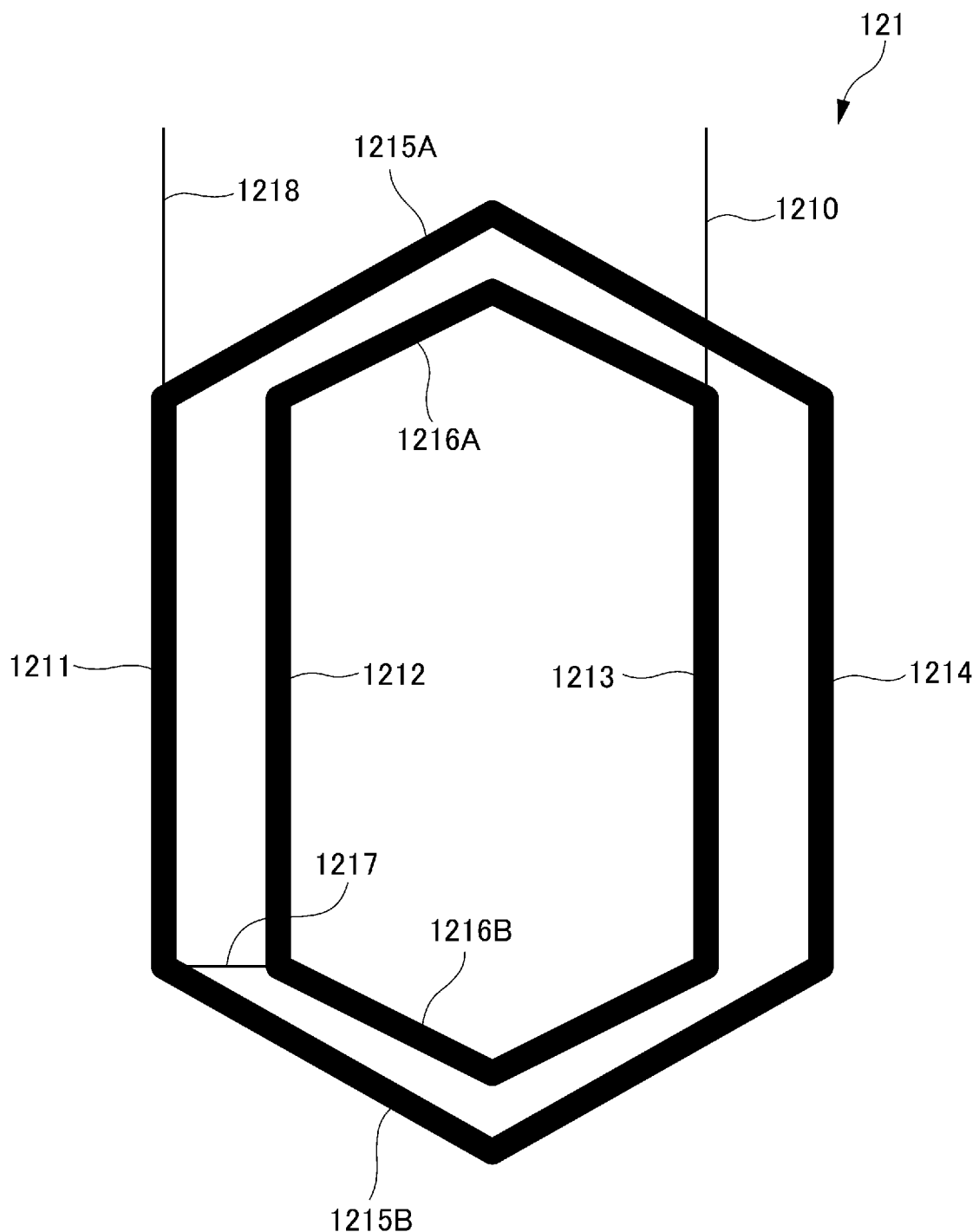
FIG. 2 is a schematic plan view of a preferred example of a double-wound coil as viewed in the radial direction.

One double-wound coil 121 includes two concentric coil portions having a substantially hexagonal shape as viewed in the radial direction (see FIG. 2). Of the two coil portions, the coil portion having a larger circumferential length (length in the circumferential direction) is hereinafter also referred to as "outer coil portion," and the coil portion having a smaller circumferential length is hereinafter also referred to as "inner coil portion." A preferred example of the double-wound coil 121 will be described later with reference to FIGS. 2 and 3.

One double-wound coil 121 is inserted into four slots 15. That is, the outer coil portion is inserted into two slots 15, and the inner coil portion is inserted into other two slots 15.

Specifically, the outer coil portion of one double-wound coil 121 is inserted into a pair of slots 15 on the outer side in the circumferential direction, and the inner coil portion of the double-wound coil 121 is inserted into a pair of slots 15 on the inner side in the circumferential direction. In this case, the pair of slots 15 on the outer side in the circumferential direction sandwiches five slots 15 in the circumferential direction (that is, the outer coil portion is long-pitch winding). That is, the outer coil portion of one double-wound coil 121 is disposed over seven slots 15 in the circumferential direction. The pair of slots 15 on the inner side in the circumferential direction sandwiches three slots 15 in the circumferential direction (that is, the inner coil portion is short-pitch winding). That is, the inner coil portion of one double-wound coil 121 is disposed over five slots 15 in the circumferential direction. In this case, the circumferential length of the outer coil portion is the circumferential length corresponding to seven slots, and the circumferential length of the inner coil portion is the circumferential length corresponding to five slots, which correspond to the respective coil pitches.

For example, of the six double-wound coils 121U, one double-wound coil 121U marked with a star in FIG. 1 includes an outer coil portion inserted into the pair of slots 15-2, 15-8 on the outer side in the circumferential direction, and an inner coil portion inserted into the pair of slots 15-3, 15-7 on the inner side in the circumferential direction. In this case, the circumferential center of the pair of slots 15-2, 15-8 on the outer side in the circumferential direction coincides with the circumferential center of the pair of slots 15-3, 15-7 on the inner side in the circumferential direction. The center is the position of the slot 15-5. The above is basically the same for the other double-wound coils 121U and for the double-wound coils 121V, 121W.

Particularly in the present embodiment, in the double-wound coils 121U, 121V, and 121W, a pair of outer cassette coil portions of the same phase is inserted into a plurality of specific slots by long-pitch winding (hereinafter also referred to as "long-pitch winding slots") out of the plurality of slots 15. For example, the long-pitch winding slots for the double-wound coils 121U are slots 15-2, 15-8, 15-14, 15-20, 15-26, and 15-32.

In the double-wound coils 121U, 121V, and 121W, a pair of inner coil portions of different phases is inserted into another plurality of specific slots by short-pitch winding (hereinafter also referred to as "short-pitch winding slots") out of the plurality of slots. For example, the short-pitch winding slots for the double-wound coils 121U are slots 15-1, 15-3, 15-7, 15-9, 15-13, 15-15, 15-19, 15-21, 15-25, 15-27, 15-31, and 15-33. Of these short-pitch winding slots, the inner coil portion of the double-wound coil 121V is inserted into the slot 15-1, the inner coil portion of the double-wound coil 121W is inserted into the slot 15-3, the inner coil portion of the double-wound coil 121V is inserted into the slot 15-7, and the inner coil portion of the double-wound coil 121W is inserted into the slot 15-9. The same applies to the remaining short-pitch winding slots.

In the present embodiment, the inner coil portions of different phases are inserted into the slot 15 in such a manner that the inner coil portion of one of the phases is located on the radially inner side and the inner coil portion of the other phase is located on the radially outer side. In the double-wound coils 121 according to the present embodiment, the inner coil portion of the double-wound coil 121U of the U-phase is located at the radially outermost position and the inner coil portion of the double-wound coil 121W of the W-phase is located at the radially innermost position in any of the short-pitch winding slots. As a result, in any of the short-pitch winding slots, the inner coil portion of the double-wound coil 121V of the V-phase is located radially inward of the inner coil portion of the double-wound coil 121U or located radially outward of the inner coil portion of the double-wound coil 121W.

Specifically, in any of the short-pitch winding slots, the inner coil portion of the double-wound coil 121U is located radially outward of the inner coil portions of the double-wound coils 121 of the other phases, that is, the inner coil portion of the double-wound coil 121V and the inner coil portion of the double-wound coil 121W.

In any of the short-pitch winding slots, the inner coil portion of the double-wound coil 121W is located radially inward of the inner coil portions of the double-wound coils 121 of the other phases, that is, the inner coil portion of the double-wound coil 121U and the inner coil portion of the double-wound coil 121V.

In any of the short-pitch winding slots, the inner coil portion of the double-wound coil 121V when paired with the inner coil portion of the double-wound coil 121U is located radially inward of the inner coil portion of the double-wound coil 121U, and the inner coil portion of the double-wound coil 121V when paired with the inner coil portion of the double-wound coil 121W is located radially outward of the inner coil portion of the double-wound coil 121W.

According to the stator coil 12 of the present embodiment, the U-phase, the V-phase, and the W-phase can be easily assembled in this order from the radially outer side by using an insert etc., and very good assembly performance is therefore obtained (which will be described later with reference to FIGS. 11 and 12).

FIG. 2 is an illustration of a preferred example of the double-wound coil 121, and is a schematic plan view as viewed in the radial direction. Although one double-wound coil 121 will be described below, the same applies substantially to the other double-wound coils 121 as described above (only difference is in portions such as crossover wires).

In the example shown in FIG. 2, the double-wound coil 121 includes a first slot insertion portion 1211, a second slot insertion portion 1212, a third slot insertion portion 1213, a fourth slot insertion portion 1214, first and second crossovers 1215A, 1215B, third and fourth crossovers 1216A, 1216B, a switching connection portion 1217, and end portions 1210, 1218.

The double-wound coil 121 is a single piece from the end portion 1210 to the end portion 1218, and may be formed by winding one or more coil wires (whose sectional shape is circular or rectangular) around a spool one or more times. The number of slot insertion portions (N, N–1) described below corresponds to the number of the coil wires. In FIG. 2, the thick lines represent a state in which the number of wires is two or more. The end portions 1210, 1218 are bent from a linear shape shown in the figure.

The first slot insertion portion 1211, the second slot insertion portion 1212, the third slot insertion portion 1213, and the fourth slot insertion portion 1214 are portions of coil pieces that are inserted into the slots 15. The slots 15 into which the first slot insertion portion 1211, the second slot insertion portion 1212, the third slot insertion portion 1213, and the fourth slot insertion portion 1214 are inserted are different from each other. In the present embodiment, as described above, for one double-wound coil 121, the center between the pair of slots 15 into which the first slot insertion portion 1211 and the fourth slot insertion portion 1214 are inserted (long-pitch winding slots) coincides with the center between the pair of slots 15 into which the second slot insertion portion 1212 and the third slot insertion portion 1213 are inserted (short-pitch winding slots). For one double-wound coil 121, the slot 15 into which the first slot insertion portion 1211 is inserted (long-pitch winding slot) and the slot 15 into which the second slot insertion portion 1212 is inserted (short-pitch winding slot) are adjacent to each other in the circumferential direction, and the slot 15 into which the fourth slot insertion portion 1214 is inserted (long-pitch winding slot) and the slot 15 into which the third slot insertion portion 1213 is inserted (short-pitch winding slot) are adjacent to each other in the circumferential direction. In this case, the first slot insertion portion 1211 and the fourth slot insertion portion 1214 together with the first and second crossovers 1215A, 1215B form the outer coil portion described above, and the second slot insertion portion 1212 and the third slot insertion portion 1213 together with the third and fourth crossovers 1216A, 1216B form the inner coil portion described above.

For example, when the one double-wound coil 121U marked with a star in FIG. 1 is formed by the double-wound coil 121 shown in FIG. 2, the slot 15-8 is the long-pitch winding slot, the slot 15-7 is the short-pitch winding slot, the slot 15-3 is the short-pitch winding slot, and the slot 15-2 is the long-pitch winding slot.

The first crossover 1215A forms a lead-side coil end. One side in the circumferential direction of the first crossover 1215A is connected to a lead-side end portion of the first slot insertion portion 1211, and the other side in the circumferential direction of the first crossover 1215A is connected to a lead-side end portion of the fourth slot insertion portion 1214.

The second crossover 1215B forms a counter-lead-side coil end. One side in the circumferential direction of the second crossover 1215B is connected to a counter-lead-side end portion of the first slot insertion portion 1211, and the other side in the circumferential direction of the second crossover 1215B is connected to a counter-lead-side end portion of the fourth slot insertion portion 1214.

The third crossover 1216A forms the lead-side coil end. One side in the circumferential direction of the third crossover 1216A is connected to a lead-side end portion of the second slot insertion portion 1212, and the other side in the circumferential direction of the third crossover 1216A is connected to a lead-side end portion of the third slot insertion portion 1213.

The fourth crossover 1216B forms the counter-lead-side coil end. One side in the circumferential direction of the fourth crossover 1216B is connected to a counter-lead-side end portion of the second slot insertion portion 1212, and the other side in the circumferential direction of the fourth crossover 1216B is connected to a counter-lead-side end portion of the third slot insertion portion 1213.

The switching connection portion 1217 forms a connection portion between the inner coil portion and the outer coil portion. Specifically, the switching connection portion 1217 is connected to an end portion of the fourth crossover 1216B close to the second slot insertion portion 1212. One side in the circumferential direction of the switching connection portion 1217 is connected to the counter-lead-side end portion of one third slot insertion portion 1213 via the fourth crossover 1216B, and the other side in the circumferential direction of the switching connection portion 1217 is connected to the counter-lead-side end portion of one first slot insertion portion 1211.

When forming a double-wound coil 121 having N first slot insertion portions 1211 as described above, the process is repeated in the order of the end portion 1210, the third slot insertion portion 1213, the fourth crossover 1216B, the second slot insertion portion 1212, the third crossover 1216A, the third slot insertion portion 1213, and the fourth crossover 1216B until N third slot insertion portions 1213 and N fourth crossovers 1216B are formed. When the Nth fourth crossover 1216B is formed, the switching connection portion 1217 is formed from the Nth fourth crossover 1216B, and then the process is similarly repeated in the order of the first slot insertion portion 1211, the first crossover 1215A, the fourth slot insertion portion 1214, the second crossover 1215B, the first slot insertion portion 1211, the first crossover 1215A, the fourth slot insertion portion 1214, and the second crossover 1215B until N−1 second crossovers 1215B are formed. When the (N−1)th second crossover 1215B is formed, the Nth first slot insertion portion 1211 is formed and then the end portion 1218 is formed.

According to such a double-wound coil 121, the number of first slot insertion portions 1211 and the number of fourth slot insertion portions 1214 can be made different from each other by one, and the number of second slot insertion portions 1212 and the number of third slot insertion portions 1213 can be made different from each other by one. That is, assuming that the number of first slot insertion portions 1211 is N (≥2), the number of fourth slot insertion portions 1214 can be N−1, the number of second slot insertion portions 1212 can be N−1, and the number of third slot insertion portions 1213 can be N. The switching connection portion 1217 is connected to one of the N first slot insertion portions 1211, and is connected to one of the N third slot insertion portions 1213 via the fourth crossover 1216B. Similarly, the end portions 1210, 1218 are connected to one of the N third slot insertion portions 1213 and one of the N first slot insertion portions 1211, respectively. In a modification, the switching connection portion 1217 may be connected to the counter-lead-side end portion of one first slot insertion portion 1211 via a part of the second crossover 1215B.

In such a double-wound coil 121, the total number of coil pieces (number of coils) of the outer coil portion that are inserted into the corresponding slots 15 and the total number of coil pieces (number of coils) of the inner coil portion that are inserted into the corresponding slots 15 are equal to each other. That is, assuming that the number of first slot insertion portions 1211 is N (≥2), the total number of first slot insertion portions 1211 and fourth slot insertion portions 1214 is 2N−1, and the total number of second slot insertion portions 1212 and third slot insertion portions 1213 is 2N−1. Thus, these total numbers are equal to each other.

Such a double-wound coil 121 can be easily assembled in the corresponding slots 15 by using a jig (inserter), which can improve the assembly efficiency.

Figure 3:
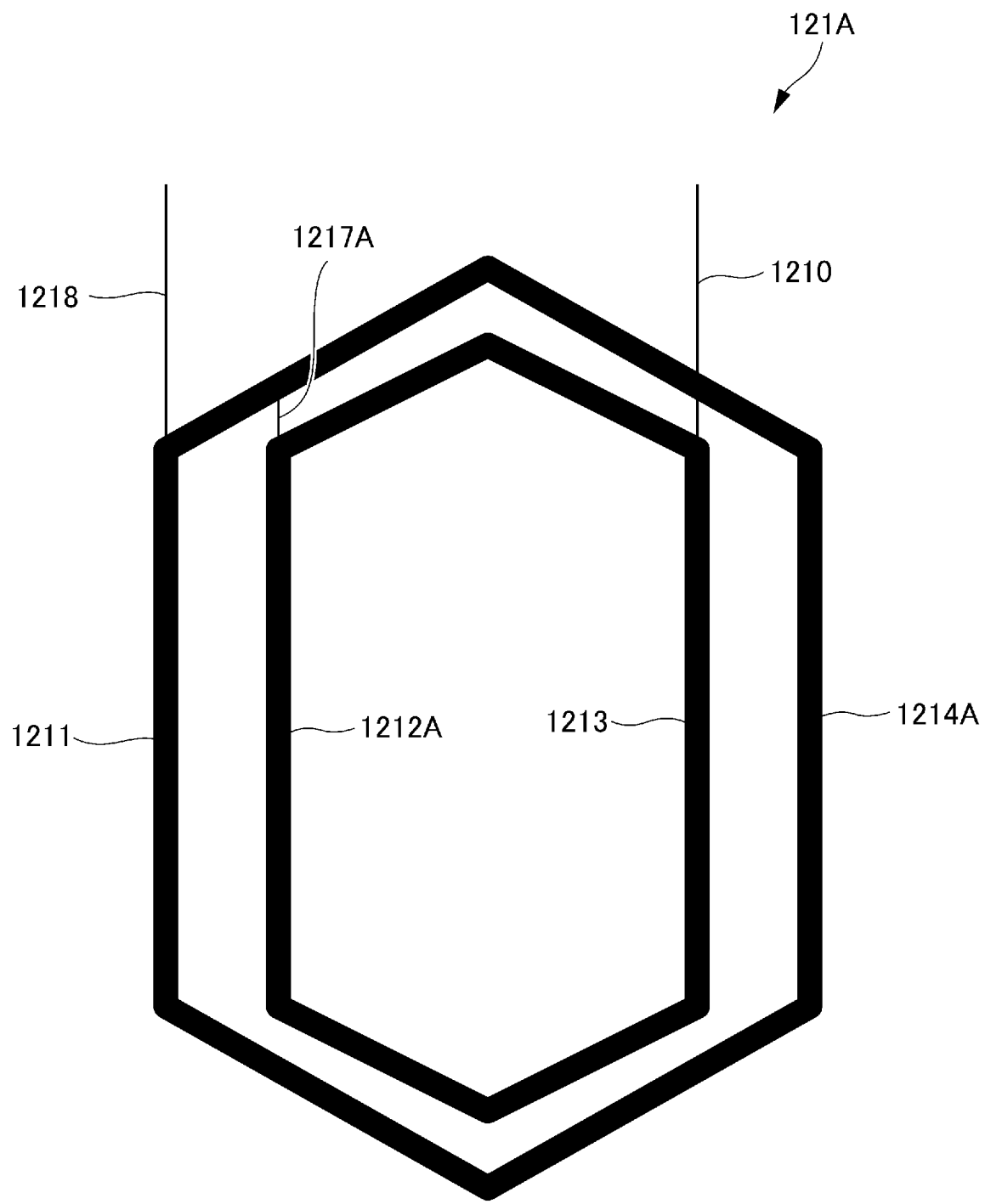
FIG. 3 is a schematic plan view of another example of the double-wound coil as viewed in the radial direction.

FIG. 3 is an illustration of a double-wound coil 121A according to another example, and is a schematic plan view as viewed in the radial direction.

The double-wound coil 121A according to this example is different from the double-wound coil 121 shown in FIG. 2 in that the second slot insertion portion 1212, the fourth slot insertion portion 1214, and the switching connection portion 1217 are replaced by a second slot insertion portion 1212A, a fourth slot insertion portion 1214A, and a switching connection portion 1217A, respectively.

The double-wound coil 121A according to this example is essentially different from the double-wound coil 121 shown in FIG. 2 in the position of the switching connection portion 1217A. Therefore, the number of first slot insertion portions 1211, the number of second slot insertion portions 1212A, the number of third slot insertion portions 1213, and the number of fourth slot insertion portions 1214A are equal to each other. That is, assuming that the number of first slot insertion portions 1211 is N, the number of fourth slot insertion portions 1214A can be N, the number of second slot insertion portions 1212A can be N, and the number of third slot insertion portions 1213 can be N.

In such a double-wound coil 121A, as in the double-wound coil 121 shown in FIG. 2, the total number of coil pieces (number of coils) of the outer coil portion that are inserted into the corresponding slots 15 and the total number of coil pieces (number of coils) of the inner coil portion that are inserted into the corresponding slots 15 are equal to each other. That is, assuming that the number of first slot insertion portions 1211 is N (≥2), the total number of first slot insertion portions 1211 and fourth slot insertion portions 1214A is 2N, and the total number of second slot insertion portions 1212A and third slot insertion portions 1213 is 2N. Thus, these total numbers are equal to each other.

A stator 10 with an odd number of slot insertion portions inserted therein can thus be formed by using the double-wound coil 121 having the configuration shown in FIG. 2. When the double-wound coil 121A having the configuration shown in FIG. 3 is used, a stator (not shown) with an even number of slot insertion portions inserted therein can be formed.

The number of slot insertion portions that are inserted into each slot 15 of the stator 10 varies depending on output characteristics etc. to be implemented by the rotating electrical machine including the stator 10. A relatively large number of slot insertion portions are typically inserted into each slot 15 in a rotating electrical machine with a relatively high output.

In this regard, when the double-wound coil 121 having the configuration shown in FIG. 2 or the double-wound coil 121A having the configuration shown in FIG. 3 is selectively used, the configuration of the rotating electrical machine can be optimized to implement a specific output characteristic. For example, it is herein assumed that the specific output characteristic is implemented when a total of seven slot insertion portions are inserted into each slot 15. In this case, if a configuration in which a total of six slot insertion portions are inserted into each slot 15 is implemented using the double-wound coil 121A having the configuration shown in FIG. 3, the output characteristic tends to be insufficient. If a configuration in which a total of eight slot insertion portions are inserted into each slot 15 is implemented using the double-wound coil 121A having the configuration shown in FIG. 3, the output characteristic is excessive. In such a case, such a disadvantage can be prevented by using the double-wound coil 121 having the configuration shown in FIG. 2. In other words, the flexibility in the number of slot insertion portions that can be inserted into one slot 15 can be increased.

When the double-wound coil 121 having the configuration shown in FIG. 2 is used, N first slot insertion portions 1211 and N third slot insertion portions 1213 are formed, and the numbers of first and second crossovers 1215A, 1215B and the number of third crossovers 1216A can be made to be N−1. As a result, the numbers of first and second crossovers 1215A, 1215B forming the coil ends can be efficiently reduced, and the size of the coil ends can be reduced.

Figure 4:
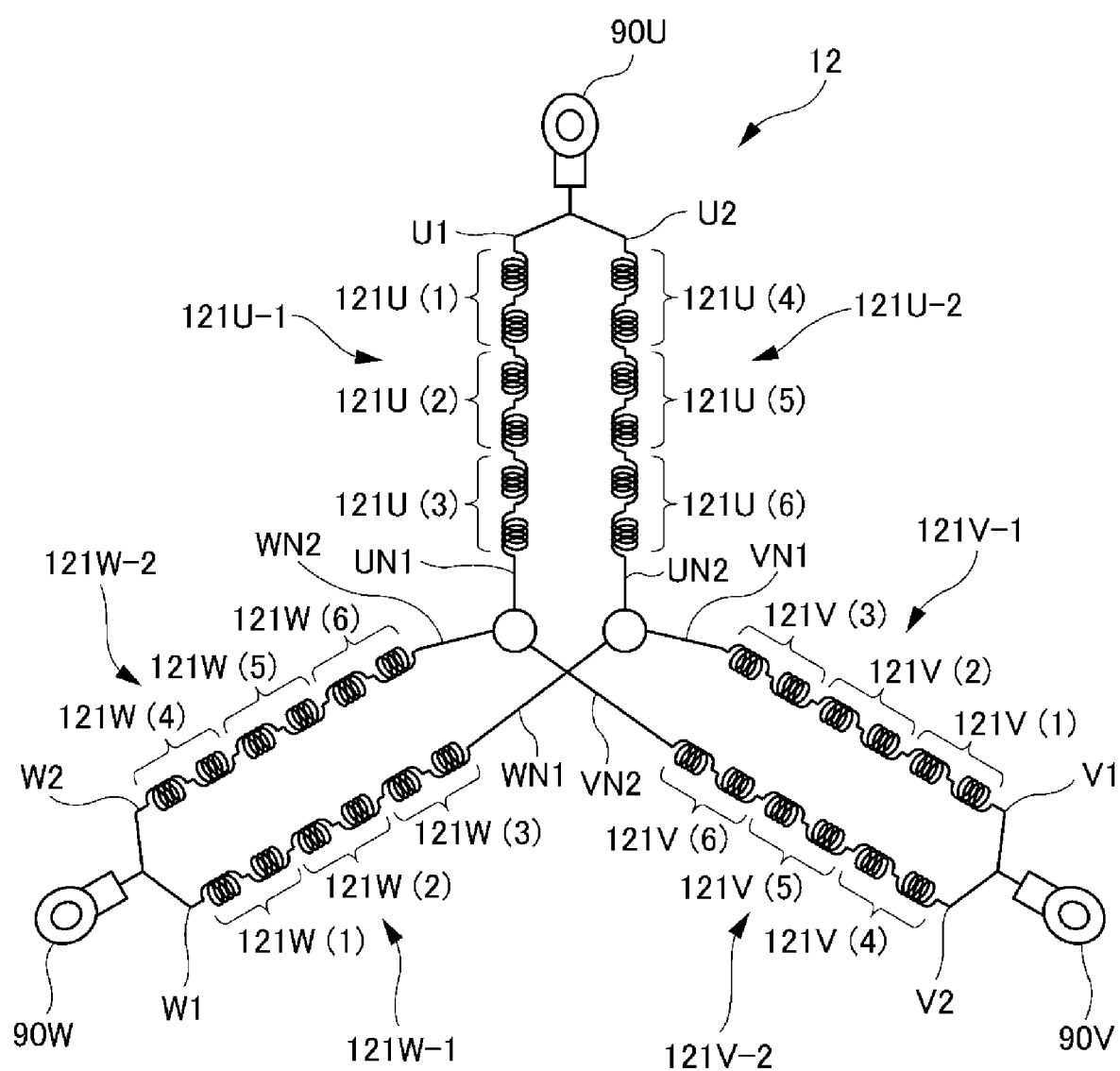
FIG. 4 is a diagram showing the overall configuration of a stator coil.

FIG. 4 is a diagram schematically showing an example of a connection mode of the stator coil 12. In the present embodiment, as schematically shown in FIG. 4, the stator coil 12 is electrically connected at a neutral point of star connection in such a manner that two sets of each phase are parallel to each other. Specifically, in the stator coil 12, two sets of the U-phase, that is, double-wound coils 121U-1, 121U-2, are electrically connected in parallel between the neutral point and a U-phase terminal 90U on the power line side. The same applies to the other phases. In the stator coil 12, two sets of the V-phase, that is, double-wound coils 121V-1, 121V-2, are electrically connected in parallel between the neutral point and a V-phase terminal 90V on the power line side. In the stator coil 12, two sets of the W-phase, that is, double-wound coils 121W-1, 121W-2, are electrically connected in parallel between the neutral point and a W-phase terminal 90W on the power line side.

In FIG. 4, each set of double-wound coils, for example, the double-wound coil 121U-1, includes the three double-wound coils 121 described above and forms a total of six coil portions. Hereinafter, of the three double-wound coils 121 in each set of each phase, one double-wound coil 121 farthest from the neutral point is also referred to as "first double-wound coil 121," and the other two double-wound coils 121 are also referred to as "second double-wound coils 121." When distinguish among the phases, the first double-wound coils 121 are sometimes referred to as first double-wound coils 121U, 121V, and 121W.

In each of the two sets of the U-phase, the first double-wound coil 121U has its one end electrically connected to the U-phase terminal 90U on the power line side with no other double-wound coils 121 interposed therebetween, and has the other end electrically connected to an end portion on the power line side of the second double-wound coil 121U. Similarly, in each of the two sets of the V-phase, the first double-wound coil 121V has its one end electrically connected to the V-phase terminal 90V on the power line side with no other double-wound coils 121 interposed therebetween, and has the other end electrically connected to an end portion on the power line side of the second double-wound coil 121V. Similarly, in each of the two sets of the W-phase, the first double-wound coil 121W has its one end electrically connected to the W-phase terminal 90W on the power line side with no other double-wound coils 121 interposed therebetween, and has the other end electrically connected to an end portion on the power line side of the second double-wound coil 121W.

Next, the configuration of the stator coil 12 will be described in more detail with reference to FIG. 5 and subsequent figures. Hereinafter, an example using the double-wound coil 121 shown in FIG. 2 will be described as an example. However, the same applies to when the double-wound coil 121A shown in FIG. 3 or other double-wound coil (not shown) is used. Hereinafter, the lead-side coil end will be described unless otherwise specified. However, the same applies to the counter-lead-side coil end. In the following description, the crossovers of the double-wound coil 121 refer to the first crossover 1215A and the third crossover 1216A of the double-wound coil 121 shown in FIG. 2, unless otherwise specified. In the following description, the slot insertion portions of the outer coil portion of the double-wound coil 121 refer to the first slot insertion portion 1211 and the fourth slot-insertion portion 1214 of the double-wound coil 121 shown in FIG. 2, unless otherwise specified. The crossover is a portion starting from an axial end portion of the slot insertion portion (axial end portion of the portion that fits inside the slot 15).

Figure 5:
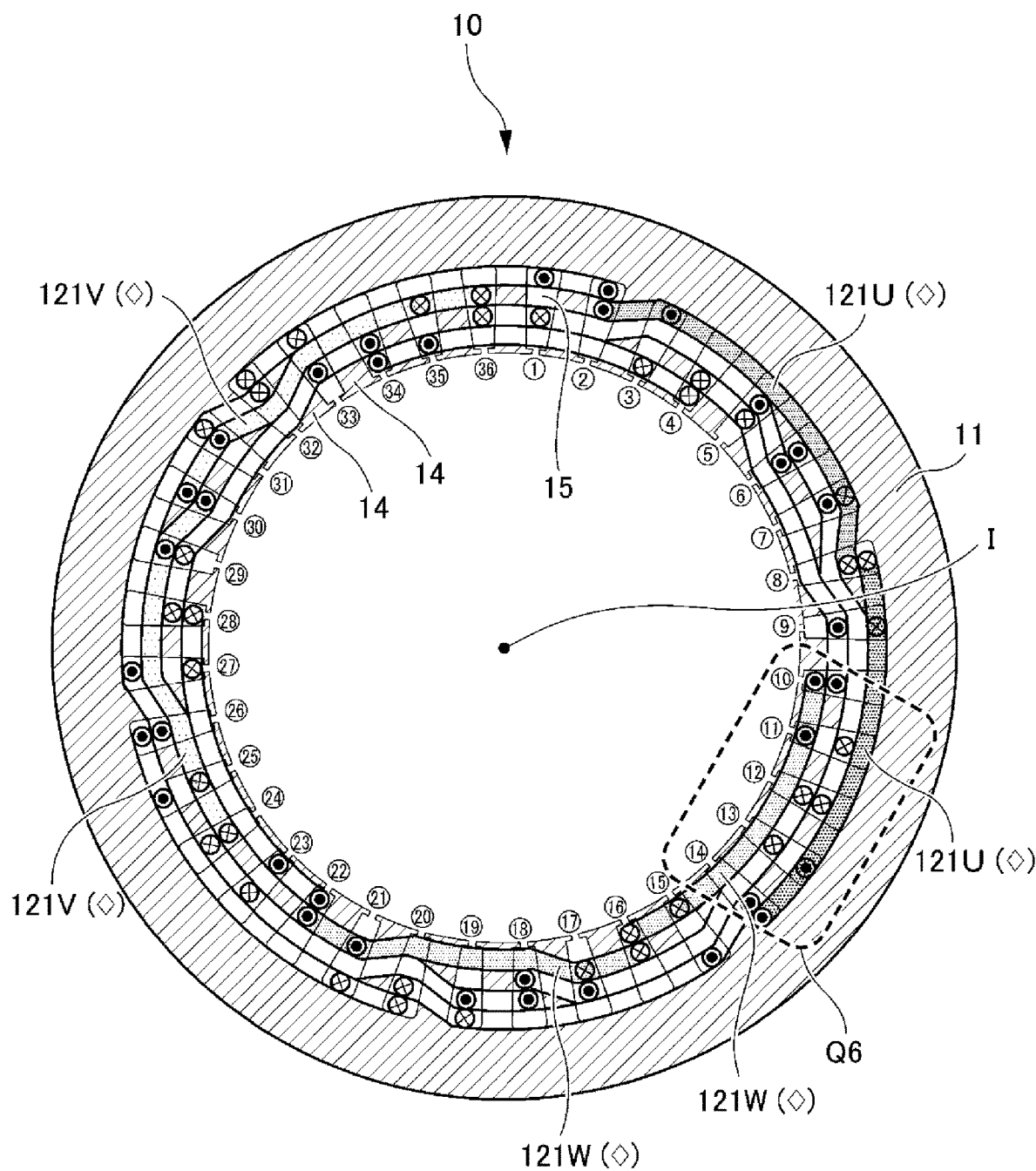
FIG. 5 is a sectional view illustrating arrangement of first double-wound coils.
Figure 6:
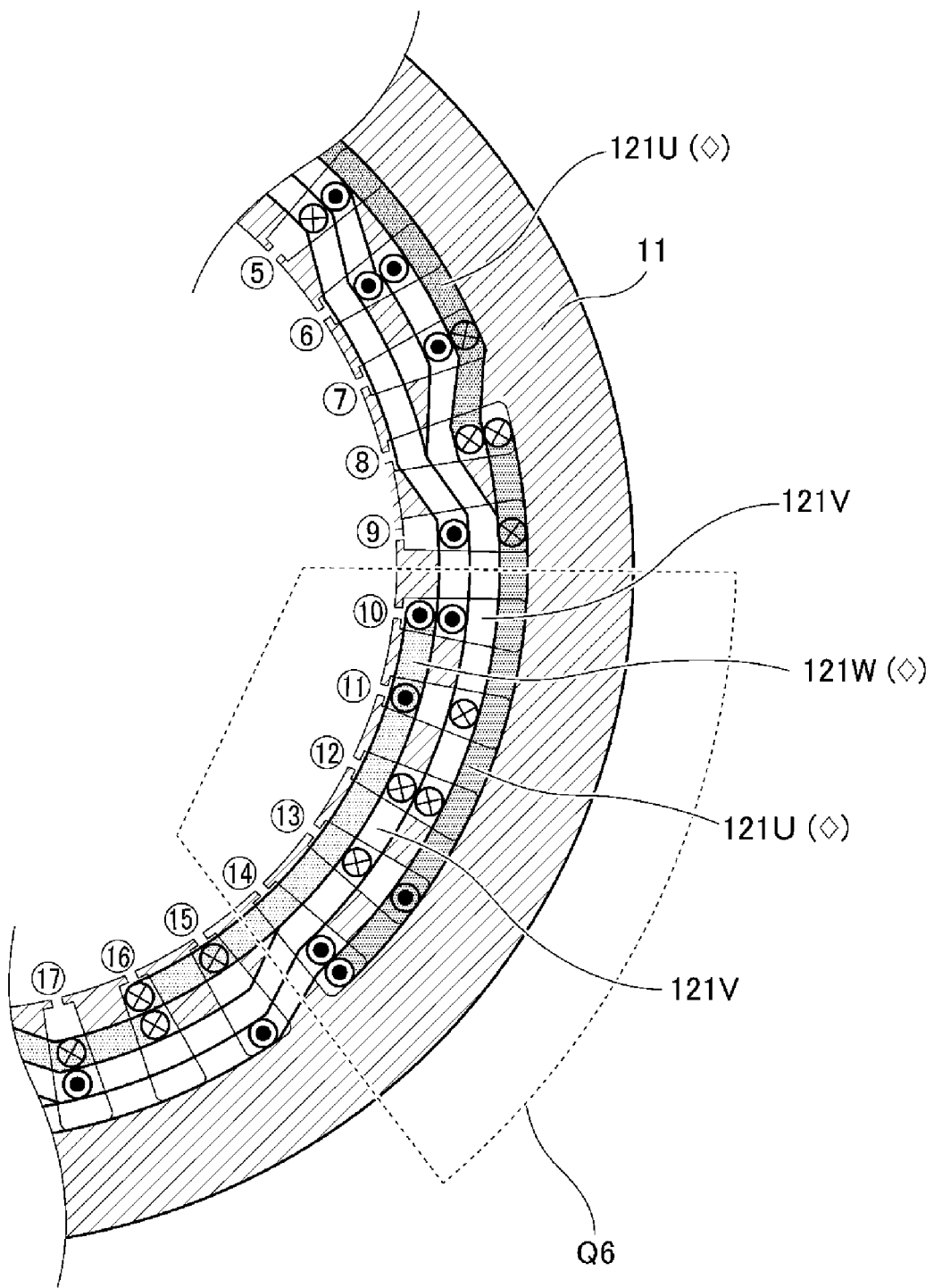
FIG. 6 is an enlarged view of a region around a portion Q6 in FIG. 5.
Figure 7:
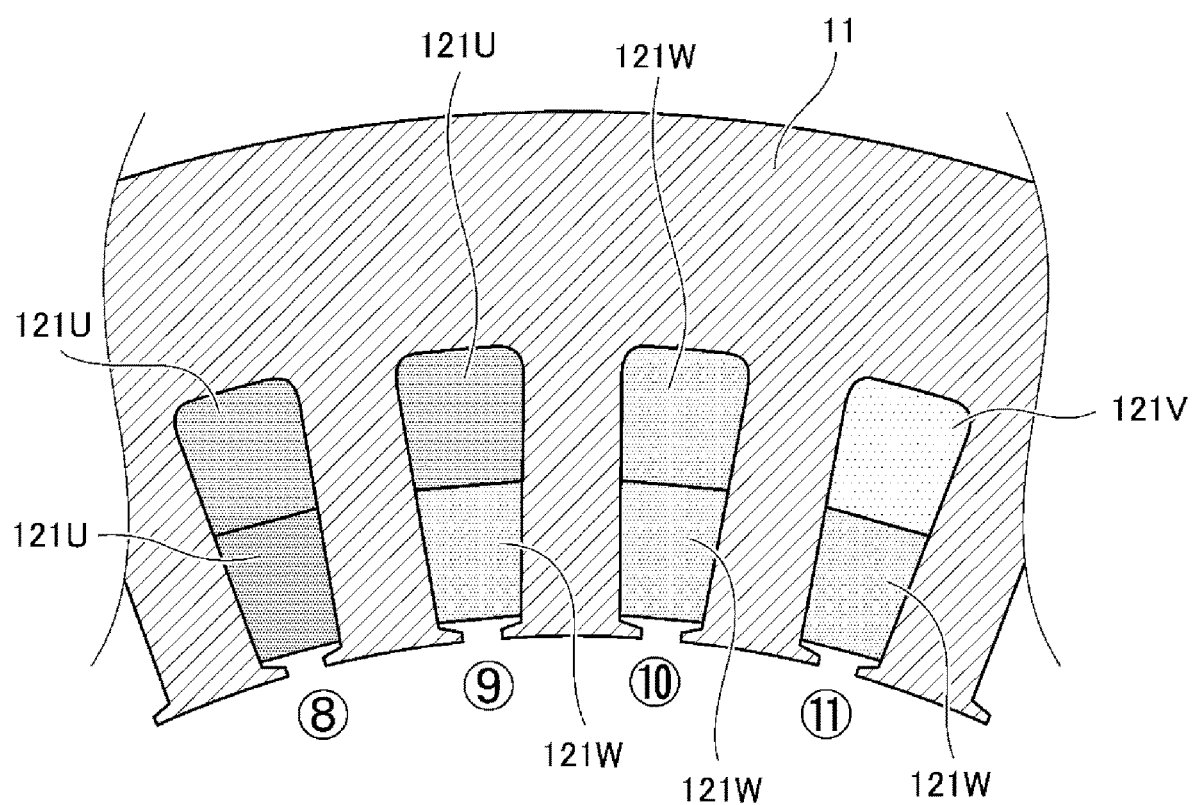
FIG. 7 is a diagram showing the configuration inside slots.

FIG. 5 is an illustration of the arrangement of the first double-wound coils 121, and corresponds to the diagram of FIG. 1 with only the first double-wound coils 121 shown hatched. In FIG. 5 (and also FIG. 8 etc. that will be described later), the first double-wound coils 121 are marked with a "diamond (rhombus)" in parentheses following the sign 121U etc. in order to distinguish between the first double-wound coil 121 and the second double-wound coil 121. FIG. 6 is an enlarged view of a region around a portion Q6 in FIG. 5, and is an illustration of the configuration in a specific circumferential section. FIG. 7 is a diagram illustrating the arrangement of the double-wound coils 121 in each slot 15, and representatively schematically shows the arrangement in some of the slots, namely the slots 15-8 to 15-11.

In the present embodiment, as shown in FIGS. 5 and 6, the first double-wound coil 121U of the U-phase and the first double-wound coil 121W of the W-phase overlap each other in the specific circumferential section (see the portion Q6 in FIGS. 5 and 6), and as shown in FIGS. 5 and 7, the first double-wound coils 121 of different phases are inserted into different slots 15.

Specifically, the two first double-wound coils 121U of the U-phase extend in the circumferential direction over a circumferential section from the slot 15-2 to the slot 15-14, the two first double-wound coils 121V of the V-phase extend in the circumferential direction over a circumferential section from the slot 15-24 to the slot 15-36, and the two first double-wound coils 121W of the W-phase extend in the circumferential direction from the slot 15-10 to the slot 15-22. Therefore, in this case, a circumferential section corresponding to the five slots 15-10 to 15-14 is the specific circumferential section, and the first double-wound coil 121U of the U-phase and the first double-wound coil 121W of the W-phase overlap each other in this specific circumferential section. As used herein, "overlap" refers to extending in the same circumferential section.

The two first double-wound coils 121U of the U-phase are inserted into the slots 15-2, 15-3, 15-7, 15-8, 15-9, 15-13, and 15-14, and the two first double-wound coils 121V of the V-phase are inserted in the slots 15-24, 15-25, 15-29, 15-30, 15-31, 15-35, and 15-36. The two first double-wound coils 121W of the W-phase are inserted into the slots 15-10, 15-11, 15-15, 15-16, 15-17, 15-21, and 15-22. As described above, the two first double-wound coils 121U of the U-phase are inserted in the slots 15 different from those of the two first double-wound coils 121V of the V-phase and the two first double-wound coils 121W of the W-phase. The two first double-wound coils 121V of the V-phase are inserted into the slots 15 different from those of the two first double-wound coils 121W of the W-phase.

The U-phase terminal 90U, the V-phase terminal 90V, and the W-phase terminal 90W are electrically connected to a high potential side and a low potential side according to the ON-OFF state of each switching element of an inverter (not shown). Therefore, when the rotating electric machine is driven, a relatively large potential difference is generated according to the rated voltage of a high-voltage battery (not shown) (or boosted voltage when boosted by a DC-to-DC converter etc.). Therefore, of the double-wound coils 121 of different phases, the largest potential difference is generated between the first double-wound coils 121 located closest to the U-phase terminal 90U, the V-phase terminal 90V, and the W-phase terminal 90W. That is, of the double-wound coils 121 of different phases, a larger potential difference is generated between the first double-wound coils 121 than between the second double-wound coils 121 and between the first double-wound coil 121 and the second double-wound coil 121.

For this reason, when the stator coil 12 is formed by such a plurality of double-wound coils 121, insulation properties required as the stator coil 12 can be easily ensured if a necessary electrical insulation distance can be provided between the first double-wound coils 121 of different phases.

In this regard, in the present embodiment, as described above, the first double coil 121U of the U-phase and the first double coil 121W of the W-phase overlap only in the specific circumferential section in the circumferential direction. Therefore, it is easy to ensure insulation in the coil ends in the other circumferential sections. Accordingly, it is possible to reduce or eliminate the need for measures for phase-to-phase insulation in the circumferential sections other than the specific circumferential section. As a result, for example, it is possible to implement a configuration in which no interphase insulating paper is provided in the circumferential sections other than the specific circumferential section out of the entire circumferences of the coil ends of the stator coil 12. This can prevent disadvantages caused by the interphase insulating paper (increase in cost, complication of the assembly process, etc.).

In the present embodiment, in the specific circumferential section, the crossover of the second double-wound coil 121V is disposed between the crossover of the first double-wound coil 121U of the U-phase and the crossover of the first double-wound coil 121W of the W-phase in the radial direction, as shown in FIGS. 5 and 6. The first double-wound coil 121U of the U-phase and the first double-wound coil 121W of the W-phase thus overlap but are not directly adjacent to each other in the radial direction in the specific circumferential section. It is therefore possible to reduce or eliminate the need for measures for phase-to-phase insulation even in the specific circumferential section. As a result, for example, it is possible to implement a configuration in which no interphase insulating paper is provided in the specific circumferential section as well out of the entire circumferences of the coil ends of the stator coil 12.

According to the present embodiment, the first double-wound coils 121 of different phases are not inserted into the same slot 15. It is therefore possible to reduce or eliminate the need for measures for phase-to-phase insulation in all the slots 15. As a result, for example, it is possible to implement a configuration in which no interphase insulating paper is provided for any slot insertion portions of the stator coil 12 (for example, the first slot insertion portion 1211 etc. in the example shown in FIG. 2). By implementing such a configuration in which no interphase insulating paper is provided inside the slots 15, the coil space factor in the slots 15 can be increased. In other words, the size of the stator core 11 can be reduced without changing the coil space factor in the slots 15, as compared to the case where interphase insulating paper is provided in the slots 15.

Next, the configuration of the present embodiment will further be described together with another embodiment (hereinafter also referred to as "second embodiment") with reference to FIGS. 5, 6, and 8 to 10.

Figure 8:
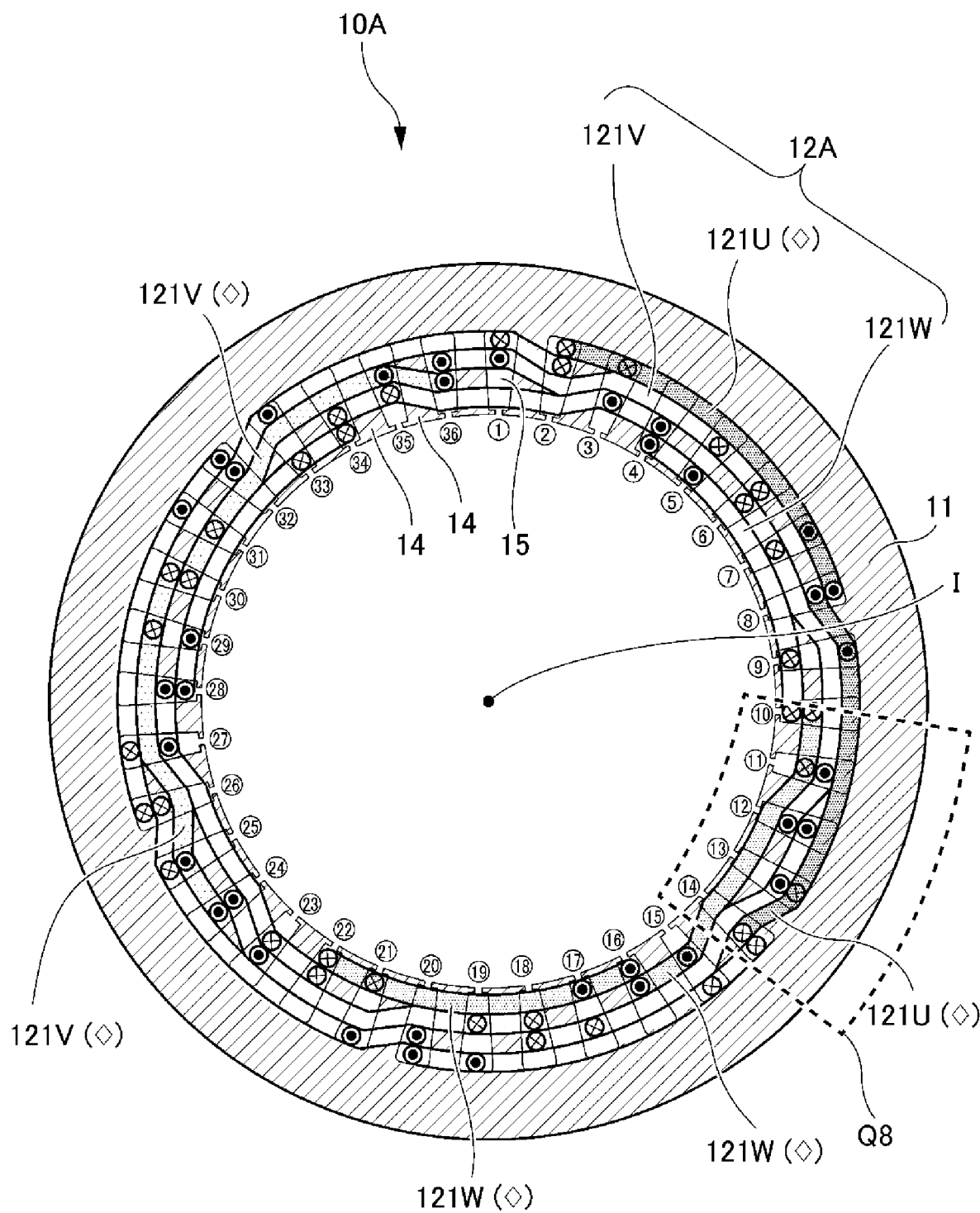
FIG. 8 is a sectional view of a stator for a rotating electrical machine according to a second embodiment.
Figure 8A:
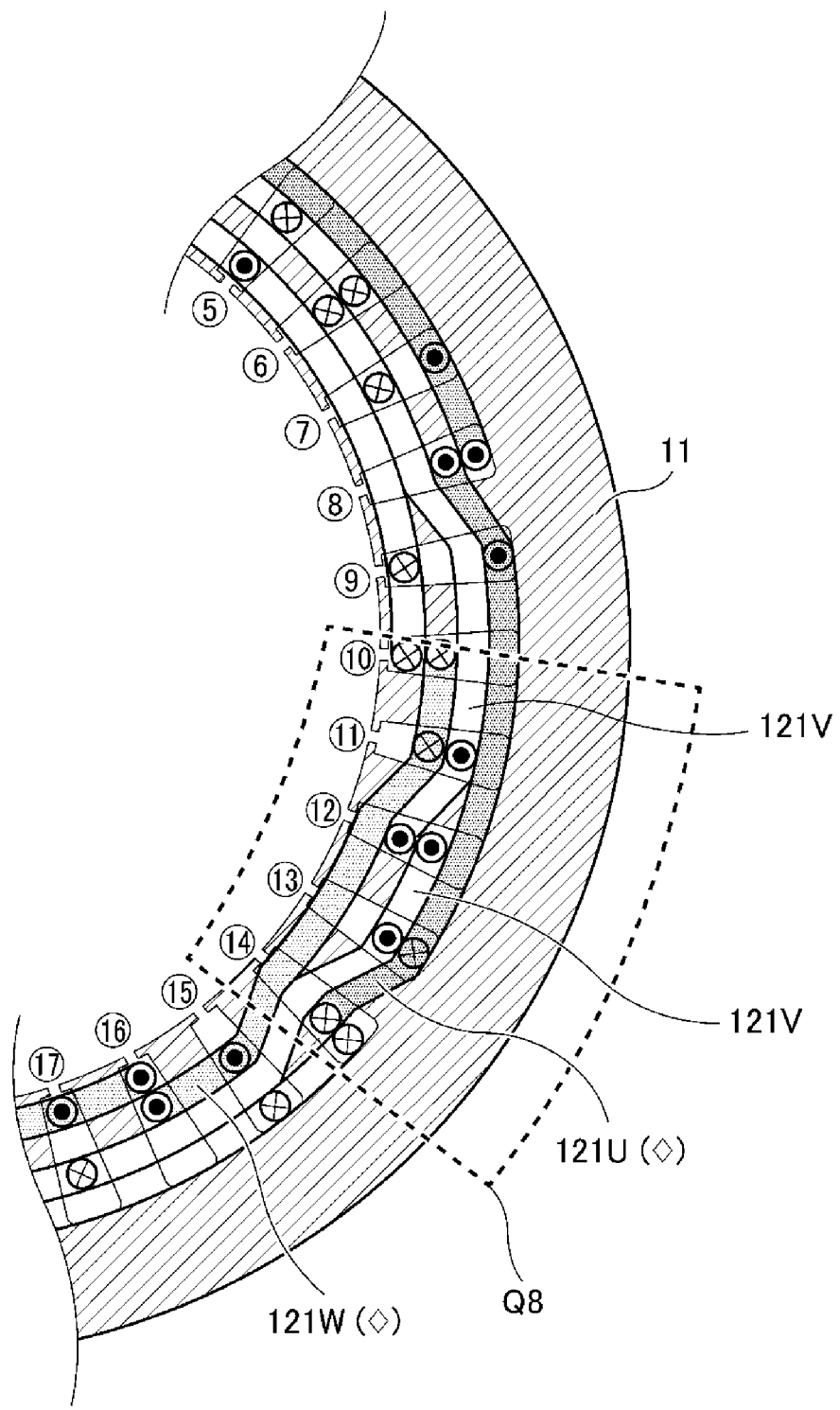
FIG. 8A is an enlarged view of a region around a portion Q8 in FIG. 8.
Figure 9:
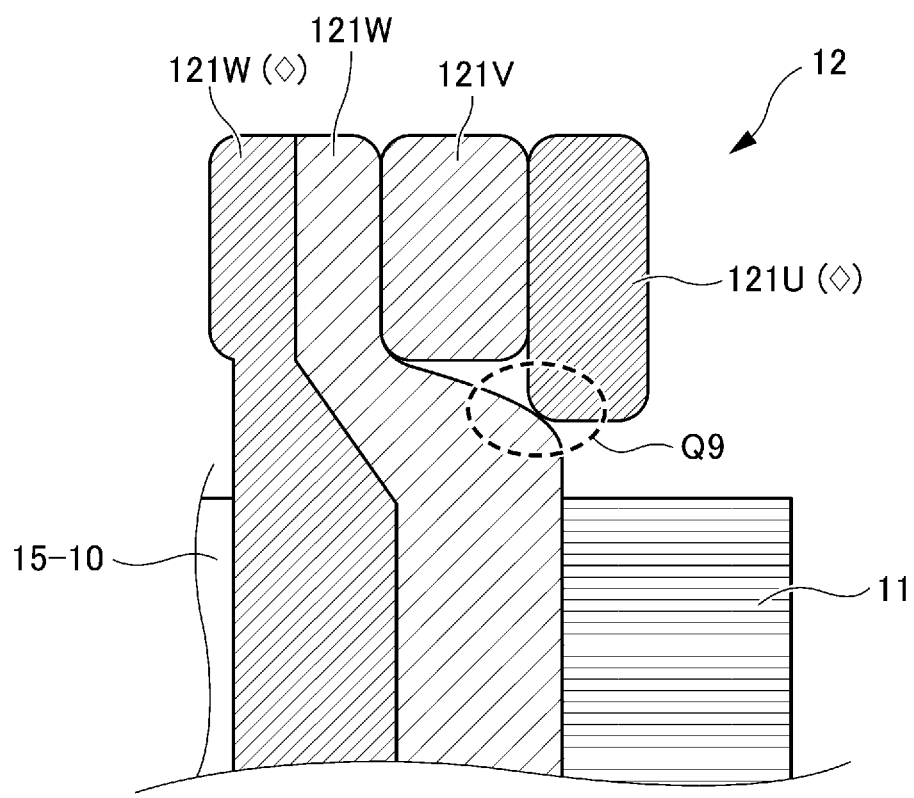
FIG. 9 is a sectional view showing the arrangement of crossovers from an end slot in a specific circumferential section (configuration according to the present embodiment).
Figure 10:
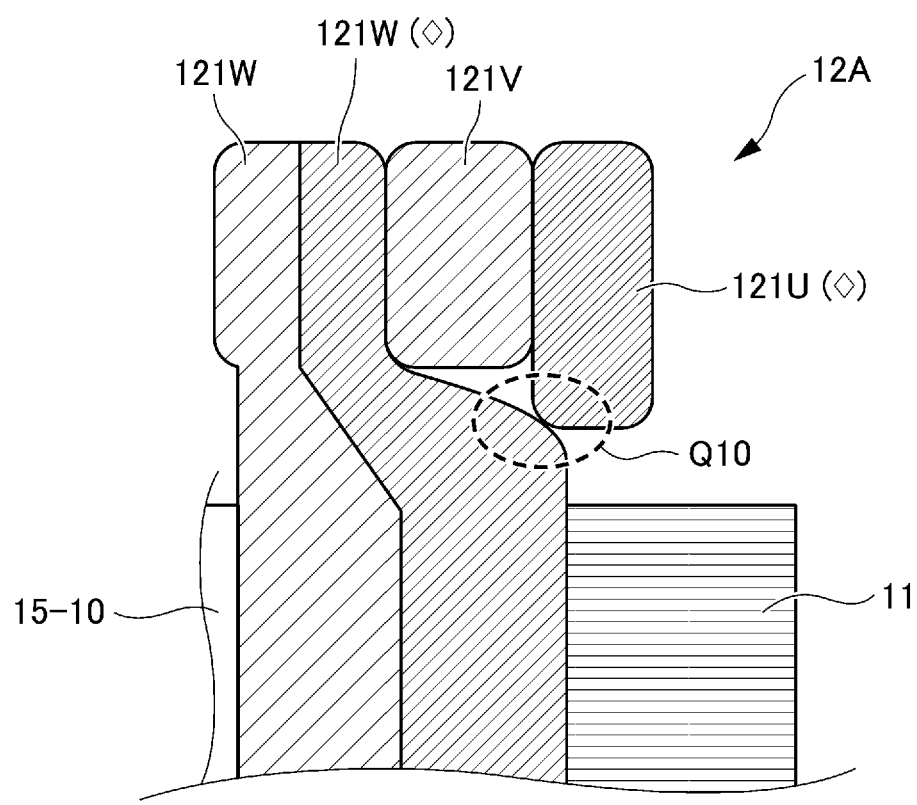
FIG. 10 is a sectional view showing the arrangement of crossovers from the end slot in the specific circumferential section (configuration according to the second embodiment).

FIG. 8 is a sectional view showing the arrangement of a stator coil 12A of a stator 10A according to the second embodiment. As in FIG. 5, only the first double-wound coils 121 out of the double-wound coils 121 are shown hatched in FIG. 8. FIG. 8A is an enlarged view of a portion Q8 in FIG. 8. FIG. 9 is an illustration of the arrangement of the crossovers from an end slot in the specific circumferential section according to the present embodiment, and is a sectional view of part of the stator 10 taken along a plane including the rotation axis I. FIG. 10 is an illustration of the arrangement of the crossovers from the end slot in the specific circumferential section according to the second embodiment, and is a sectional view of part of the stator 10A taken along a plane including the rotation axis I. In FIGS. 9 and 10, as in FIG. 5 etc. described above, the first double-wound coils 121 are marked with a "diamond (rhombus)" in parentheses in order to distinguish between the first double-wound coil 121 and the second double-wound coil 121.

The stator coil 12A of the stator 10A according to the second embodiment is mainly different from the stator coil 12 of the present embodiment in the arrangement of the slot insertion portions in the slots forming both ends of the specific circumferential section (slots 15-10, 15-14 in the present embodiment).

Specifically, in the stator coil 12 according to the present embodiment, in the slots forming both ends of the specific circumferential section (hereinafter also referred to as "end slots in the specific circumferential section (example of the specific slot)") (slots 15-10, 15-14 in the present embodiment), as shown in FIGS. 5 and 6, the slot insertion portions of the first double-wound coil 121 of one phase are disposed farther from the first double-wound coil 121 of another phase in the radial direction than the slot insertion portions of the second double-wound coil 121 of the one phase are. More specifically, in the slot 15-10, the slot insertion portion of the first double-wound coil 121W of the W-phase is inserted radially inward of the slot insertion portion of the second double-wound coil 121W of the W-phase (that is, radially farther from the crossover of the first double-wound coil 121U of the U-phase that extends across the slot 15-10 in the circumferential direction than the slot insertion portion of the second double-wound coil 121W of the W-phase is). In the slot 15-14, the slot insertion portion of the first double-wound coil 121U of the U-phase is inserted radially outward of the slot insertion portion of the second double-wound coil 121U of the U-phase (that is, radially farther from the crossover of the first double-wound coil 121W of the W-phase that extends across the slot 15-14 in the circumferential direction than the slot insertion portion of the second double-wound coil 121U of the U-phase is).

On the other hand, in the stator coil 12A according to the second embodiment, in the end slots in the specific circumferential section (slots 15-10, 15-14 in the present embodiment) (see the portion Q8 in FIG. 8), the slot insertion portions of the first double-wound coil 121 of one phase are inserted radially closer to the first double-wound coil 121 of another phase than the slot insertion portions of the second double-wound coil 121 of the one phase, as shown in FIG. 8. More specifically, in the slot 15-10, the slot insertion portion of the first double-wound coil 121W of the W-phase is inserted radially outward of the slot insertion portion of the second double-wound coil 121W of the W-phase (that is, radially closer to the crossover of the first double-wound coil 121U of the U-phase extending across the slot 15-10 in the circumferential direction than the slot insertion portion of the second double-wound coil 121W of the W-phase is). In the slot 15-14, the slot insertion portion of the first double-wound coil 121U of the U-phase is inserted radially inward of the slot insertion portion of the second double-wound coil 121U of the U-phase (that is, radially closer to the crossover of the first double-wound coil 121W of the W-phase that extends across the slot 15-14 in the circumferential direction than the slot insertion portion of the second double-wound coil 121U of the U-phase is).

In this second embodiment, as shown in FIG. 10, the crossovers of the first double-wound coils 121 of different phases tend to be located close to each other near the axial end faces of the stator core 11 in the end slots in the specific circumferential section (slot 15-10 out of the slots 15-10, 15-14 is shown in FIG. 10) (see a portion Q10 in FIG. 10). In FIG. 10, in the slot 15-10, the crossover of the first double-wound coil 121W of the W-phase is located close to the crossover of the first double-wound coil 121U of the U-phase in the section of the first double-wound coil 121W that is bent radially inward. Therefore, in the second embodiment, measures for phase-to-phase insulation may be required locally in the end slots of the specific circumferential section.

On the other hand, in the present embodiment, as shown in FIG. 9, the crossovers of the first double-wound coils 121 of different phases do not contact each other near the axial end faces of the stator core 11 in the end slots in the specific circumferential section (slot 15-10 out of the slots 15-10, 15-14 is shown in FIG. 9) (see a portion Q9 in FIG. 9). That is, the crossover of the first double-wound coil 121 and the crossover of the second double-wound coil 121 of different phases contact each other, so that the crossover of the first double-wound coil 121 of different phases can be prevented from contacting each other. In FIG. 9, in the slot 15-10, the crossover of the second double-wound coil 121W of the W-phase is located close to the crossover of the first double-wound coil 121U of the U-phase in the section of the first double-wound coil 121W that is bent radially inward. However, the crossover of the first double-wound coil 121W of the W-phase is separated from the crossover of the first second-wound coil 121U of the U-phase in the radial direction.

In this case, in the end slots in the specific circumferential section (slot 15-10 out of the slots 15-10, 15-14 is shown in FIG. 9), the crossovers of the two second double-wound coils 121 are interposed between the crossovers of the first double-wound coils 121 of different phases. Therefore, the radial distance between the crossovers of the first double-wound coils 121 of the different phases can be efficiently increased.

As described above, according to the present embodiment, it is possible to reduce or eliminate the need for measures for phase-to-phase insulation that may arise locally in relation to the end slots in the specific circumferential section. As a result, for example, it is possible to implement a configuration in which no interphase insulating paper is provided in the entire coil ends of the stator coil 12.

The need for measures for phase-to-phase insulation that may arise locally in relation to the end slots in the specific circumferential section may arise even in the second embodiment. However, the second embodiment has the other effects of the above embodiment.

Next, a method for manufacturing the stator 10 will be described with reference to FIGS. 4, 11, and 12. Although the method for manufacturing the stator 10 according to the above embodiment will be described below, the same may apply to the method for manufacturing the stator 10A according to the second embodiment.

The method for manufacturing the stator 10 includes a step of preparing the stator core 11 and the double-wound coils 121 described above, and a winding step. The winding step includes winding a plurality of double-wound coils 121 of each phase around the stator core 11 along the entire circumference of the stator core 11 to form the stator coil 12 of a plurality of phases.

Figure 11:
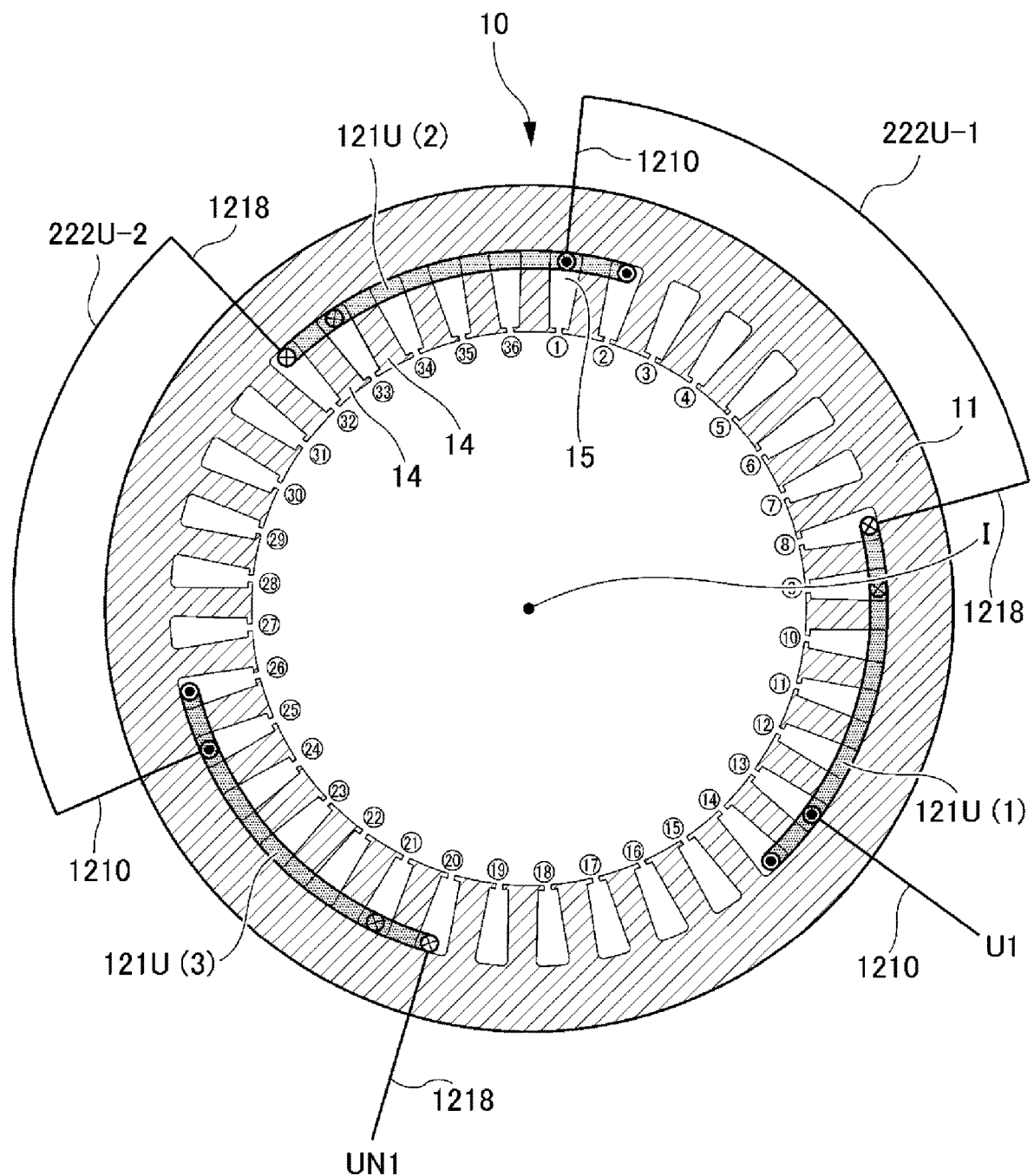
FIG. 11 is an illustration (first diagram) of a method for manufacturing the stator for a rotating electrical machine according to the present embodiment.
Figure 12:
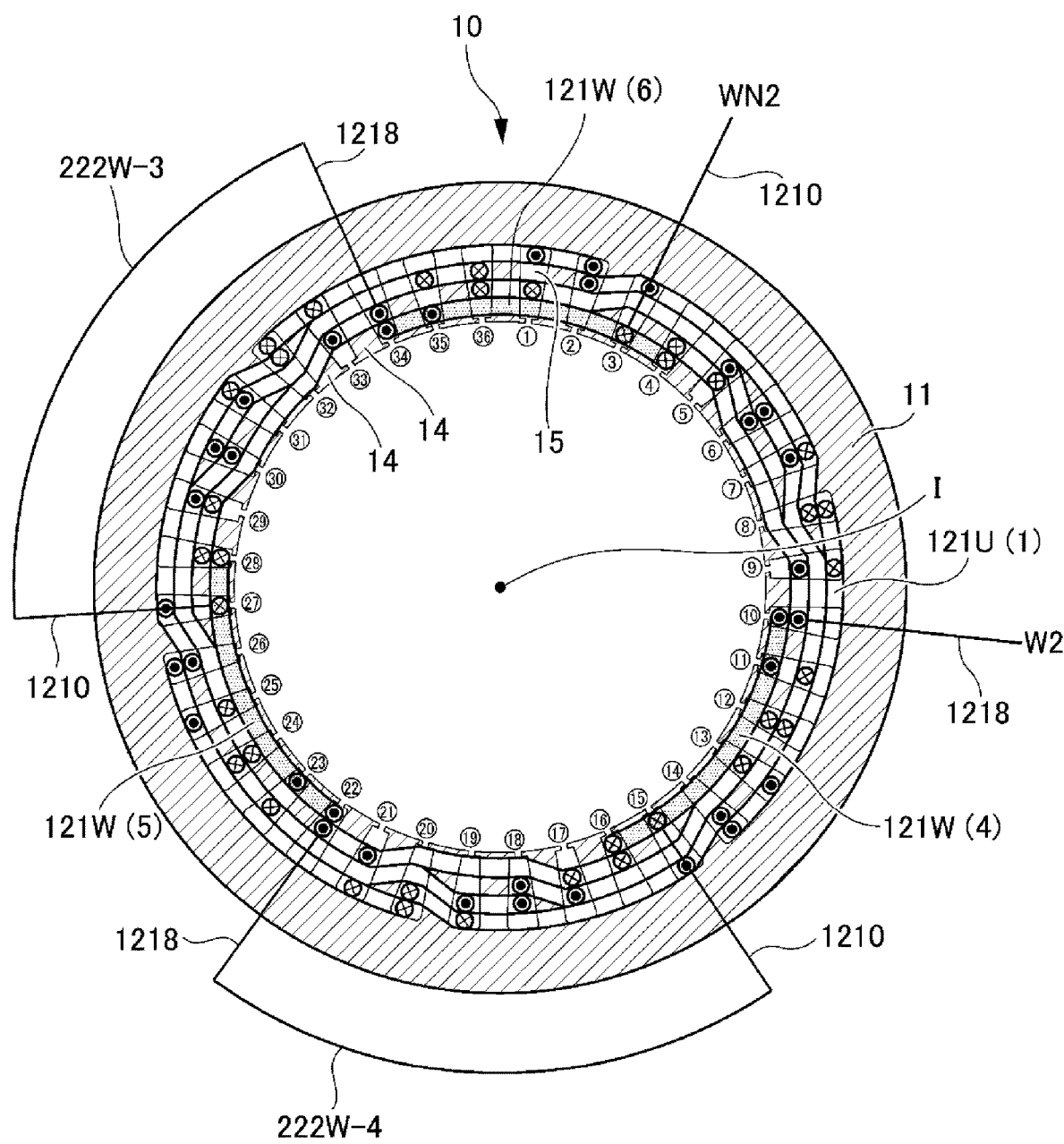
FIG. 12 is an illustration (second diagram) of the method for manufacturing of the stator for a rotating electrical machine according to the present embodiment.

FIGS. 11 and 12 are illustrations of the method of manufacturing the stator 10 for a rotating electrical machine (method for assembling the stator coil 12) according to the present embodiment. Specifically, FIG. 11 is an illustration of the step of assembling the first set of the double-wound coil 121U-1 of the U-phase, and FIG. 12 is an illustration of the step of assembling the second set of the double-wound coil 121W-2 of the W-phase. In FIG. 12, the double-wound coils 121 that have been assembled are also shown non-hatched.

The first set of the double-wound coil 121U-1 of the U-phase (see FIG. 4) includes the three double-wound coils 121U described above (shown by 121U(1) to 121U(3) in FIG. 4), and forms a total of six coil portions. The same applies to the second set of the double-wound coil 121U-2 of the U phase. The second set of the double-wound coil 121U-2 of the U-phase includes the three double-wound coils 121U described above (shown by 121U(4) to 121U (6)). In this case, 121U(1) and 121U(4) are the first double-wound coils 121U. This same applies to the other phases (V-phase and W-phase).

Specifically, the method for assembling the stator coil 12 of the present embodiment includes first assembling the first set of three double-wound coils 121U-1 of the U phase to the stator core 11 in the axial direction from axially outside using an inserter (not shown).

For example, when a double-wound coil 121 similar to the double-wound coils 121, 121A shown in FIGS. 2 and 3 is used, the axial assembling may be implemented in such a manner that the inserter inserts the first and third crossovers 1215A, 1216A of the double-wound coil 121, 121A into the stator core 11 from axially outside and move them from one side to the other side in the axial direction through the radially inner space of the stator core 11. In this case, the inserter inserts the first slot insertion portion 1211, the second slot insertion portion 1212, the third slot insertion portion 1213, and the fourth slot insertion portion 1214 of the double-wound coil 121, 121A into the slots 15 in the axial direction, causes the first and third crossovers 1215A, 1216A to reach the other side of the stator core 11, and then tilts the first and third crossovers 1215A, 1216A radially outward. Thus, the axial assembling can be completed. Alternatively, the axial assembling may be implemented in such a manner that the inserter causes the second and fourth crossovers 1215B, 1216B to move from the one side to the other side in the axial direction through the radially inner space of the stator core 11.

Since the three double-wound coils 121U(1) to 121U(3) of the first set of the double-wound coil 121U-1 of the U-phase can be assembled simultaneously, efficient assembling can be implemented as compared with the case where the three double-wound coils 121U are separately assembled to the stator core 11.

FIG. 11 schematically shows crossover wires 222U-1, 222U-2 that electrically connect in series the three double-wound coils 121U(1), 121U(2), and 121U(3) forming the first set of the second double-wound coil 121U-1 of the U-phase. When a double-wound coil 121 similar to the double-wound coils 121, 121A shown in FIGS. 2 and 3 is used, the crossover wires 222U-1, 222U-2 may be formed of the end portions 1210, 1218 shown in FIGS. 2 and 3. Specifically, the double-wound coil 121U(1) has the end portion 1210 forming an end point U1 connected to the U-phase terminal 90U (see FIG. 4). The end portion 1218 of the double-wound coil 121U(1) is continuous to the end portion 1210 of another double-wound coil 121U(2) via the crossover wire 222U-1. The end portion 1218 of the another double-wound coil 121U(2) is continuous via the crossover wire 222U-2 to the end portion 1210 of still another double-wound coil 121U(3) having the end portion 1218 connected to a neutral point UN1. The three double-wound coils 121U(1), 121U(2), and 121U(3) may be formed of one continuous coil wire.

Next, the method for assembling the stator coil 12 of the present embodiment includes assembling the second set of three double-wound coil 121U(4) to 121U(6) of the U-phase to the stator core 11 in the axial direction from axially outside using an inserter (not shown). The inserter may be the inserter used when assembling the first set of the double-wound coil 121U-1 of the U phase, and the assembling method may also be similar to that used to assemble the first set of the double-wound coil 121U-1 of the U-phase. This same applies to the subsequent V- to W-phases.

In the present embodiment, the second set of the double-wound coil 121U-2 of the U-phase can be assembled from radially inward of the first set of the double-wound coil 121U-1 of the U-phase in the stator core 11 in the axial direction from radially outside after the first set of the double-wound coil 121U-1 of the U-phase is assembled.

Therefore, like the first set of the double-wound coil 121U-1 of the U-phase described above, the three coils 121U(4), 121U(5), and 121U(6) of the second set of the double-wound coil 121U-2 of the U-phase can also be assembled simultaneously (for example, in the state in which these three coils are connected to each other). As a result, efficient assembling can be implemented as compared to the case where the three double-wound coils 121U described above are separately assembled to the stator core 11.

In a modification, the first set of the double-wound coil 121U-1 of the U-phase and the second set of the double-wound coil 121U-2 of the U-phase may be assembled to the stator core 11 in the axial direction from axially outside using an inserter (not shown) in one assembling step. In this case, the first set of the double-wound coil 121U-1 of the U-phase and the second set of the double-wound coil 121U-2 of the U-phase may be set on the inserter in the form of separate coil wires or may be set on the inserter in the form of one continuous coil wire. This same applies to the subsequent V- to W-phases.

The method for assembling the stator coil 12 of the present embodiment includes implementing similar assembling in the order of the V-phase and the W-phase.

For example, in the step of assembling the second set of the double-wound coil 121W-2 of the W-phase, as shown in FIG. 12, the double-wound coil 121W(4), namely the first double-wound coil 121W of the second set of the double-wound coil 121W-2 of the W-phase, is assembled so as to overlap the double-wound coil 121U(1), namely the first double-wound coil 121U that has been assembled, in the specific circumferential section (see the portion Q6 in FIG. 5).

FIG. 12 schematically shows crossover wires 222W-3, 222W-4 that electrically connect in series the three double-wound coils 121W(4), 121W(5), and 121W(6) forming the second set of the second double-wound coil 121W-2 of the W-phase. When a double-wound coil 121 similar to the double-wound coils 121, 121A shown in FIGS. 2 and 3 is used, the crossover wires 222W-3, 222W-4 may be formed of the end portions 1210, 1218 shown in FIGS. 2 and 3. Specifically, the end portion 1218 of the double-wound coil 121W(6) having the end portion 1210 connected to a neutral point WN2 is continuous to the end portion 1210 of another double-wound coil 121W(5) via the crossover wire 222W-3. The end portion 1218 of the another double-wound coil 121W(5) is continuous to the end portion 1210 of still another double-wound coil 121W(4) via the crossover wire 222W-4. The still another double-wound coil 121W(4) has the end portion 1218 forming an end point W2 connected to the W-phase terminal 90W (see FIG. 4).

As described above, in the present embodiment, the winding step can be implemented by inserting the first double-phase coils 121W of different phases into different slots 15 while causing the first double-wound coil 121U of the U-phase and the first double-wound coil 121W of the W-phase to overlap each other in the specific circumferential section.

Next, still another embodiment will be described with reference to FIG. 13.

Figure 13:
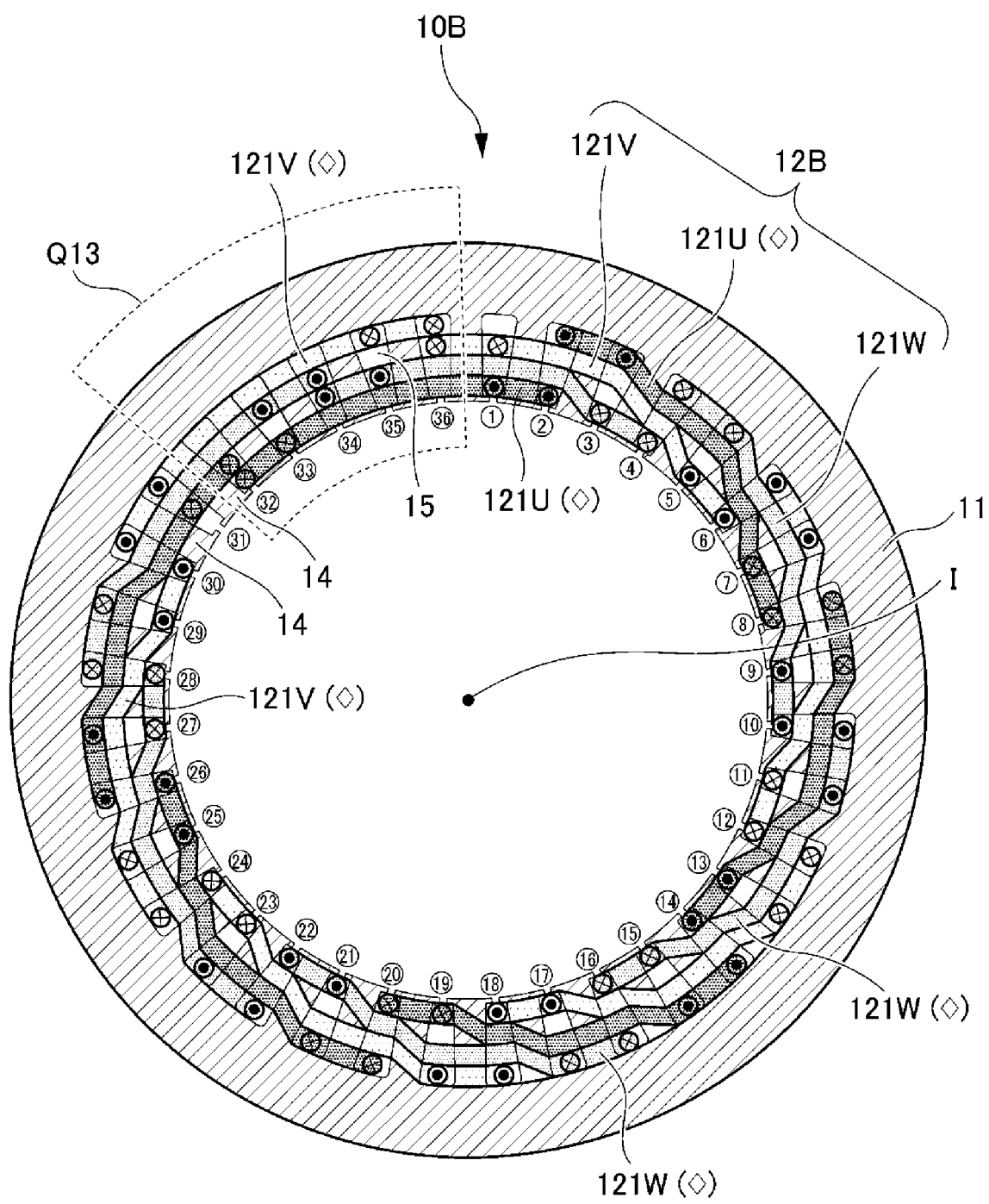
FIG. 13 is a sectional view of a stator for a rotating electrical machine according to a third embodiment.

FIG. 13 is a sectional view showing the arrangement of a stator coil 12B of a stator 10B according to still another embodiment (hereinafter referred to as "third embodiment"). As in FIG. 5, only the first double-wound coils 121 out of the double-wound coils 121 are shown hatched in FIG. 13.

The stator coil 12B of the stator 10B according to the third embodiment is the same as the stator coil 12 of the present embodiment in that a plurality of double-wound coils 121 of each phase is wound around the entire circumference of the stator core 11, but is different from the stator coil 12 of the present embodiment in the arrangement of the plurality of double-wound coils 121.

Specifically, in the above embodiment, the double-wound coils 121 of the U-phase are all disposed radially outward of the double-wound coils 121 of the other phases, and the double-wound coils 121 of the W-phase are all disposed radially inward of the double-wound coils 121 of the other phases. In the third embodiment, however, part of the plurality of double-wound coils 121 is disposed so as to run inward and outward in the radial direction between phases.

Specifically, in the double-wound coil 121 according to the above embodiment, in any of the short-pitch winding slots, the inner coil portion of the double-wound coil 121U of the U-phase is located outermost in the radial direction, and the double-wound coil 121W of the W-phase is located innermost in the radial direction. As a result, in any of the short-pitch winding slots, the inner coil portion of the double-wound coil 121V of the V-phase is located radially inward of the inner coil portion of the double-wound coil 121U or located radially outward of the inner coil portion of the double-wound coil 121W.

On the other hand, in the double-wound coil 121 according to the third embodiment, except for a plurality of double-wound coils 121 extending in the specific circumferential section (described later), the slot insertion portion on one side in the circumferential direction of the inner coil portion (in the case of the double-wound coil 121 shown in FIG. 2, the second slot insertion portion 1212 or the third slot insertion portion 1213) is inserted radially outward of the slot inserting portion of the other phase, and the slot insertion portion on the other side in the circumferential direction is inserted radially inward of the slot insertion portion of the other phase. For example, of the six double-wound coils 121U, one double-wound coil 121U marked with a star in FIG. 1 is inserted, in the slot 15-3, radially outward of the double-wound coil 121W of the W-phase inserted in this slot, and is inserted, in the slot 15-7, radially inward of the double-wound coil 121V of the V-phase inserted in this slot. Similarly, in the double-wound coil 121 according to the third embodiment, except for a plurality of double-wound coils 121 extending in the specific circumferential section (described later), the slot insertion portion on one side in the circumferential direction of the outer coil portion (in the case of the double-wound coil 121 shown in FIG. 2, the first slot insertion portion 1211 or the fourth slot insertion portion 1214) is inserted radially outward of another slot inserting portion of the same phase, and the slot insertion portion on the other side in the circumferential direction is inserted radially inward of another slot insertion portion of the same phase.

In the stator coil 12B implemented by such an arrangement of the plurality of double-wound coils 121, the arrangement of the first double-wound coils 121 (that is, the double-wound coils 121 farthest from the neutral point) can be implemented in such a manner that reduces or eliminates the need for measures for phase-to-phase insulation as in the above embodiment.

Specifically, in the third embodiment as well, the first double-wound coil 121U of the U-phase and the first double-wound coil 121V of the V-phase overlap each other in the specific circumferential section (see a portion Q13 in FIG. 13), and as shown in FIG. 13, the first double-wound coils 121 of different phases are inserted into different slots 15.

More specifically, the two first double-wound coils 121U of the U-phase extend in the circumferential direction over the circumferential section from slot 15-32 to slot 15-8 in the clockwise direction. The two first double-wound coils 121V of the V-phase extend in the circumferential direction over the circumferential section from slot 15-24 to slot 15-36. The two first double-wound coils 121W of the W-phase extend in the circumferential direction over the circumferential section from slot 15-10 to slot 15-22. Therefore, in this case, a circumferential section corresponding to the five slots 15-32 to 15-36 is the specific circumferential section, and the first double-wound coil 121U of the U-phase and the first double-wound coil 121V of the V-phase overlap each other in this specific circumferential section.

The two first double-wound coils 121U of the U-phase are inserted into the slots 15-2, 15-3, 15-7, 15-8, 15-32, 15-33, and 15-1, and the two first double-wound coils 121V of the V-phase are inserted in the slots 15-24, 15-25, 15-29, 15-30, 15-31, 15-35, and 15-36. The two first double-wound coils 121W of the W-phase are inserted into the slots 15-10, 15-11, 15-15, 15-16, 15-17, 15-21, and 15-22. As described above, the two first double-wound coils 121U of the U-phase are inserted in the slots 15 different from those of the two first double-wound coils 121V of the V-phase and the two first double-wound coils 121W of the W-phase. The two first double-wound coils 121V of the V-phase are inserted into the slots 15 different from those of the two first double-wound coils 121W of the W-phase.

As described above, in the third embodiment as well, the first double coil 121U of the U-phase and the first double coil 121V of the V-phase overlap only in the specific circumferential section in the circumferential direction. Therefore, it is easy to ensure insulation in the coil ends in the other circumferential sections. Accordingly, it is possible to reduce or eliminate the need for measures for phase-to-phase insulation in the circumferential sections other than the specific circumferential section. As a result, for example, it is possible to implement a configuration in which no interphase insulating paper is provided in the circumferential sections other than the specific circumferential section out of the entire circumferences of the coil ends of the stator coil 12B.

In the third embodiment as well, in the specific circumferential section, the crossover of the second double-wound coil 121W is disposed between the crossover of the first double-wound coil 121U of the U-phase and the crossover of the first double-wound coil 121V of the V-phase in the radial direction, as shown in FIG. 13. The first double-wound coil 121U of the U-phase and the first double-wound coil 121V of the V-phase thus overlap but are not directly adjacent to each other in the radial direction in the specific circumferential section. It is therefore possible to reduce or eliminate the need for measures for phase-to-phase insulation even in the specific circumferential section. As a result, for example, it is possible to implement a configuration in which no interphase insulating paper is provided in the specific circumferential section as well out of the entire circumferences of the coil ends of the stator coil 12B.

In the third embodiment as well, the first double-wound coils 121 of different phases are not inserted into the same slot 15. It is therefore possible to reduce or eliminate the need for measures for phase-to-phase insulation in all the slots 15. As a result, for example, it is possible to implement a configuration in which no interphase insulating paper is provided in any slot insertion portions of the stator coil 12B.

In the third embodiment as well, the crossovers of the first double-wound coils 121 of different phases do not contact each other in the end slots in the specific circumferential section, namely the slots 15-32, 15-36 (example of the specific slot). That is, in the slot 15-32, the first double-wound coil 121U of the U-phase is disposed radially inward of the second double-wound coil 121U of the U-phase (that is, radially farther from the first double-wound coil 121V of the V-phase). In the slot 15-36, the first double-wound coil 121V of the V-phase is disposed radially outward of the second double-wound coil 121V of the V-phase (that is, radially farther from the first double-wound coil 121U of the U-phase). Therefore, in the third embodiment as well, as in the case of the embodiment described above with reference to FIG. 9, the crossover of the first double-wound coil 121 and the crossover of the second double-wound coil 121 of different phases contact each other. The crossovers of the first double-wound coils 121 of different phases are thus prevented from contacting each other.

As described above, according to the third embodiment as well, it is possible to reduce or eliminate the need for measures for phase-to-phase insulation that may arise locally in relation to the end slots in the specific circumferential section. As a result, for example, it is possible to achieve a configuration in which no interphase insulating paper is provided at all in the coil ends of the stator coil 12B.

In a modification, however, in the slot 15-32, the first double-wound coil 121U of the U-phase is disposed radially outward of the second double-wound coil 121U of the U-phase (that is, radially closer to the first double-wound coil 121V of the V-phase). In the slot 15-36, the first double-wound coil 121V of the V-phase is disposed radially inward of the second double-wound coil 121V of the V-phase (that is, radially closer to the first double-wound coil 121U of the U-phase).

Although the embodiments are described in detail above, the present disclosure is not limited to specific embodiments, and various modifications and changes can be made within the scope of the claims. It is also possible to combine all or part of the constituent elements of the embodiments described above. Of the effects of each embodiment, those related to dependent claims are additional effects distinct from generic concepts (independent claims).

For example, the configuration in the case of three-phase, six-pole, and 36-slots is illustrated in the above embodiments. Therefore, the specific circumferential section is a section corresponding to five slots. In the case of other configurations, however, the specific circumferential section may be a section corresponding to fewer slots or more slots.

Each of the above embodiments can reduce or eliminate the need for measures for phase-to-phase insulation, and as a result, can implement a configuration in which no interphase insulation paper is provided. However, it is also possible to take other measures for phase-to-phase insulation using varnish, resin, etc.

DESCRIPTION OF THE REFERENCE NUMERALS

10, 10A, 10B . . . Stator (Stator for Rotating Electrical Machine), 11 . . . Stator Core, 12, 12A, 12B . . . Stator Coil, 15 . . . Slot, 121 . . . Double-Wound Coil, 1211 . . . First Slot Insertion Portion (Slot Insertion Portion), 1212, 1212A . . . Second Slot Insertion Portion (Slot Insertion Portion), 1213 . . . Third Slot Insertion Portion (Slot Insertion Portion), 1214, 1214A . . . Fourth Slot Insertion Portion (Slot Insertion Portion), 1215A . . . First Crossover (Crossover), 1215B . . . Second Crossover (Crossover), 1216A . . . Third Crossover (Crossover), 1216B . . . Fourth Crossover (Crossover)

The invention claimed is:

1. A stator for a rotating electrical machine, the stator comprising:
   a stator core having a plurality of slots; and
   a stator coil formed by winding a plurality of double-wound coils of each phase, each including two concentric coil portions having a closed coil shape as viewed in a radial direction, around the stator core along an entire circumference of the stator core, wherein:
   each of the two coil portions in one double-wound coil forms the closed coil shape by: slot insertion portions on both sides in a circumferential direction that are inserted into different slots; and crossovers on both sides in an axial direction that extend in the circumferential direction between end portions on both sides in the axial direction of the slot insertion portions on both sides in the circumferential direction;
   the plurality of double-wound coils is inserted in each slot in such a manner that the slot insertion portion of one of the double-wound coils is radially adjacent to the slot insertion portion of another one of the double-wound coils;
   the double-wound coil of each phase includes a first double-wound coil farthest from a neutral point and a second double-wound coil other than the first double-wound coil; and
   of the first double-wound coil of a first phase, the first double-wound coil of a second phase, and the first double-wound coil of a third phase, only a combination of the first double-wound coil of the first phase and the first double-wound coil of the second phase overlaps in a specific circumferential section corresponding to at least one slot, and the slot insertion portions of the first double-wound coils of different phases are inserted in different slots.

2. The stator according to claim 1, wherein the crossover of the second double-wound coil of the third phase is located between the crossover of the first double-wound coil of the first phase and the crossover of the first double-wound coil of the second phase in the radial direction in the specific circumferential section.

3. The stator according to claim 2, wherein:
   the plurality of slots includes a specific slot into which the first double-wound coil of the first phase and the second double-wound coil of the first phase are inserted in the specific circumferential section; and
   the second double-wound coil of the first phase is located between the first double-wound coil of the first phase and the first double-wound coil of the second phase in the radial direction at a circumferential position where the specific slot is located.

4. The stator according to claim 3, wherein the second double-wound coil of the third phase is located between the second double-wound coil of the first phase and the first double-wound coil of the second phase in the radial direction at the circumferential position where the specific slot is located.

5. A method for manufacturing a stator for a rotating electrical machine, the method comprising:
   a step of preparing a stator core having a plurality of slots;
   a step of preparing a plurality of double-wound coils each concentrically including a coil portion with a larger circumference length and a coil portion with a shorter circumference length; and
   a winding step of forming a stator coil of a plurality of phases by winding the plurality of double-wound coils around the stator core along an entire circumference of the stator core, wherein:
   the double-wound coil of each phase includes a first double-wound coil farthest from a neutral point and a second double-wound coil other than the first double-wound coil; and
   the winding step includes inserting the first double-wound coils of different phases into different slots while causing, of the first double-wound coil of a first phase, the first double-wound coil of a second phase, and the first double-wound coil of a third phase, only a combination of the first double-wound coil of the first phase and the first double-wound coil of the second phase to overlap in a specific circumferential section corresponding to at least one slot.

* * * * *